United States Patent
Starkey

(10) Patent No.: US 7,159,509 B2
(45) Date of Patent: Jan. 9, 2007

(54) OUTDOOR COOKING MACHINE

(75) Inventor: Roy Welcome Starkey, 3700 S. Kemper Rd., Arlington, VA (US) 22206

(73) Assignee: Roy Welcome Starkey, Arlington, VA (US)

(*) Notice: Subject to any disclaimer, the term of this patent is extended or adjusted under 35 U.S.C. 154(b) by 0 days.

(21) Appl. No.: 10/448,615

(22) Filed: May 31, 2003

(65) Prior Publication Data

US 2004/0237801 A1    Dec. 2, 2004

(51) Int. Cl.
*A47J 37/00* (2006.01)

(52) U.S. Cl. .......................... 99/339; 99/340; 99/480; 99/482; 126/25 R

(58) Field of Classification Search ................. 99/482, 99/339, 340, 476, 487, 357, 480, 474; 126/25 R, 126/19 R, 1 D
See application file for complete search history.

(56) References Cited

U.S. PATENT DOCUMENTS

| | | | |
|---|---|---|---|
| 957,748 A * | 5/1910 | Coppridge | 126/273 R |
| 2,851,941 A * | 9/1958 | Cogar | 99/352 |
| 4,020,322 A | 4/1977 | Muse | |
| 4,664,026 A | 5/1987 | Milloy | |
| 4,665,891 A | 5/1987 | Nemer et al. | |
| 4,700,618 A * | 10/1987 | Cox, Jr. | 99/339 |
| 4,757,756 A | 7/1988 | Van Marr | |
| 4,877,011 A * | 10/1989 | Willice | 126/25 R |
| 5,359,923 A | 11/1994 | Boswell | |
| 5,711,209 A * | 1/1998 | Guines | 99/339 |
| 5,768,977 A | 6/1998 | Parris et al. | |
| 5,909,729 A | 6/1999 | Nowicke, Jr. | |
| 6,039,039 A | 3/2000 | Pina, Jr. | |
| 6,209,533 B1 * | 4/2001 | Ganard | 126/25 R |

* cited by examiner

*Primary Examiner*—Reginald L. Alexander
(74) *Attorney, Agent, or Firm*—Roylance, Abrams, Berdo & Goodman, L.L.P.

(57) ABSTRACT

An outdoor cooking machine including a combination of horizontal and vertical smoker/grills. A vertical smoker/grill is connected to a horizontal smoker/grill by a tube with a damper. A variety of outdoor cooking techniques are provided, singly or in combination, by the outdoor cooking machine. Among these cooking techniques are: cold/slow smoking, hot smoking, steaming, double boiling, deep frying, stewing, food warming, spit/rotisserie cooking, conventional grilling, baking, an open firepit function, an outdoor fireplace function, and a tabletop function. Some cooking techniques use a single fire while others combine multiple fires from one or more smoker/grills to enhance and/or change cooking options.

19 Claims, 20 Drawing Sheets

OUTDOOR COOKING MACHINE

BACKGROUND

1. Field of Invention

The present invention relates to an outdoor cooking machine and, more specifically, to an outdoor cooking machine which facilitates the use of multiple cooking techniques, either simultaneously or separately.

2. Description of Prior Art

It is desirable to have multiple cooking techniques available to an out-of-doors cook. Grilling, rotisserie cooking, baking, double boiling, cold smoking, hot smoking, deep frying, and steaming are among common cooking techniques used out-of-doors. However, the machines used to provide each of these cooking techniques are generally specialized to their particular technique. Therefore, an out-of-doors cook must go to great expense and effort to amass a fleet of cooking machines, which are often bulky and difficult to store. Cooking machines are available which provide a few of the desired cooking techniques in one machine, but no one machine is available to provide all of the above cooking techniques.

The present invention is directed to overcoming one or more of the problems as set forth above.

SUMMARY OF THE INVENTION

In an exemplary, non-limiting embodiment of the present invention, a machine for heating, cooking, and smoking at least one of food and another substance, such machine is provided. According to the embodiment, the machine comprises a horizontal smoker/grill including a lower horizontal smoker/grill portion and adapted to contain at least one horizontal smoker/grill fire, a vertical smoker/grill including an upper vertical smoker/grill portion and adapted to contain a vertical smoker/grill fire and means for connecting the upper vertical smoker/grill portion to the lower horizontal smoker/grill portion. The connecting means includes a tube adapted to direct at least one of smoke and air and the machine is constructed from at least one of metal and another heat-resistant material. In accordance with this embodiment of the cooking machine, a plurality of cooking techniques are provided.

DETAILED DESCRIPTION OF AN EXEMPLARY, NON-LIMITING EMBODIMENT OF THE INVENTION

Figure 1:
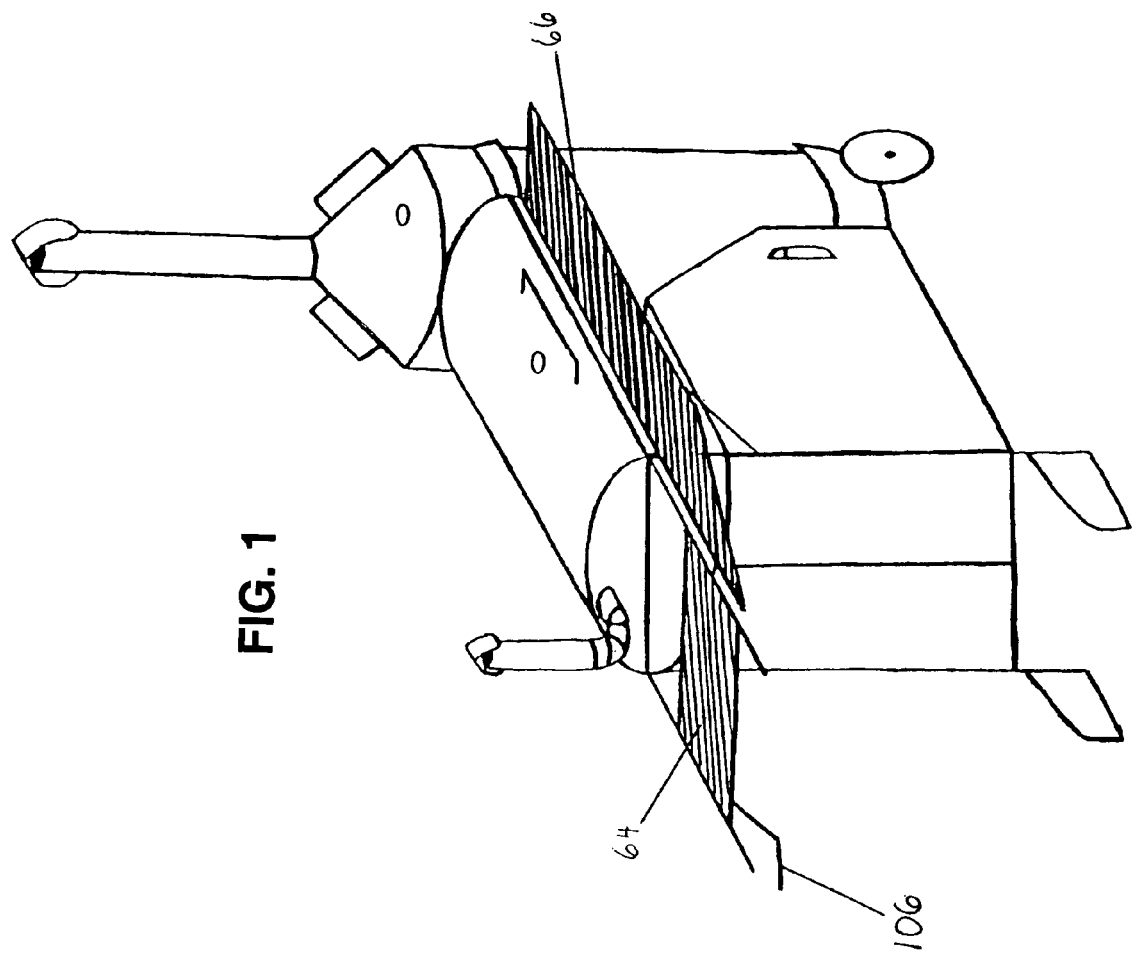
FIG. 1 is an isometric view of an exemplary, non-limiting embodiment of the present invention.

An exemplary, non-limiting embodiment of the present invention provides an outdoor cooking machine adapted to provide multiple cooking techniques, either separately or simultaneously. FIGS. 1–B depict an outdoor cooking machine consistent with the present invention.

Figure 2A:
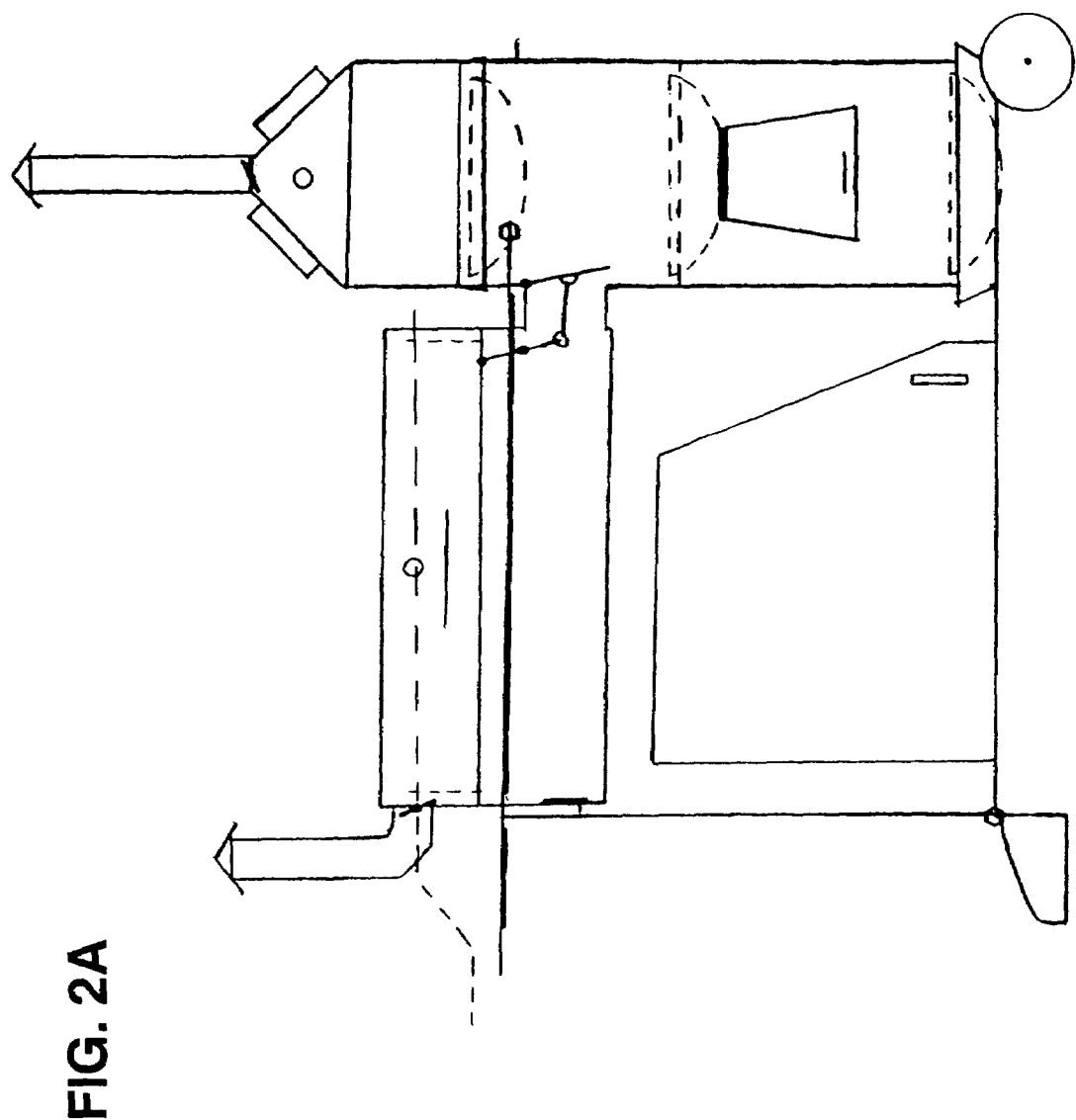
FIG. 2A is a side view of an exemplary, non-limiting embodiment of the present invention.
Figure 2B:
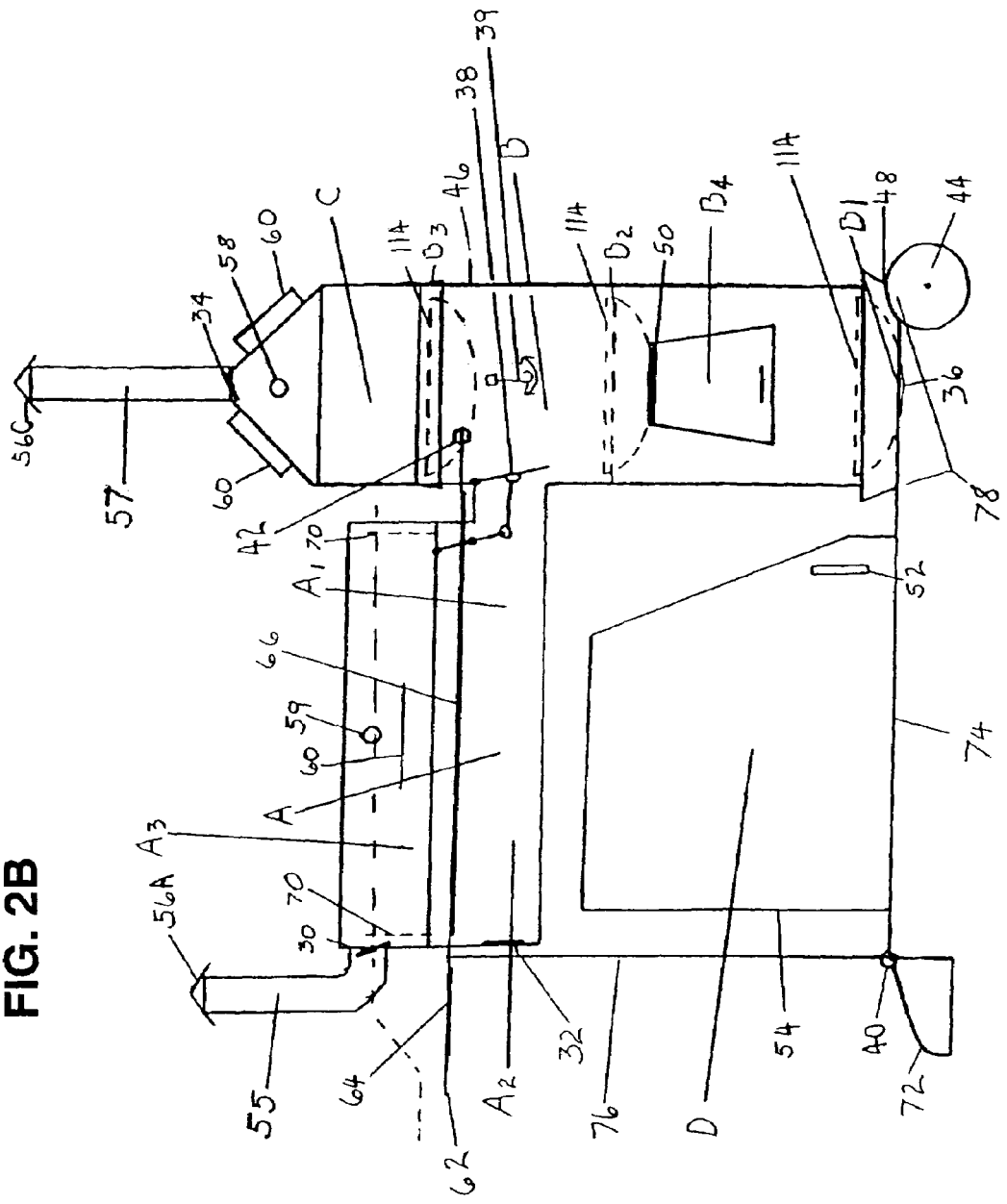
FIG. 2B is a side view of an exemplary, non-limiting embodiment of the present invention.

FIG. 2B depicts an outdoor cooking machine, shown in a "normal" or closed position, having a horizontal smoker/grill A, a vertical smoker/grill B, and a base 74. The base 74 may be held off the ground by a plurality of braces 72 or wheels 44 acting as legs; the exemplary embodiment shown in FIG. 2B includes two braces 72 on one side of the base 74 and two wheels 44 on the other side of the base 74 to aid in moving the outdoor cooking machine.

The outdoor cooking machine may be made of any suitable materials such as, but not limited to, ceramics, bricks, cast iron, thick steel plate, other materials with different heat retentive properties, or any combination thereof. Preferably the outdoor cooking machine is made of thin steel plate because of the lightness (for ease of mobility) and relative affordability and ease of construction of this type of steel.

Figure 3:
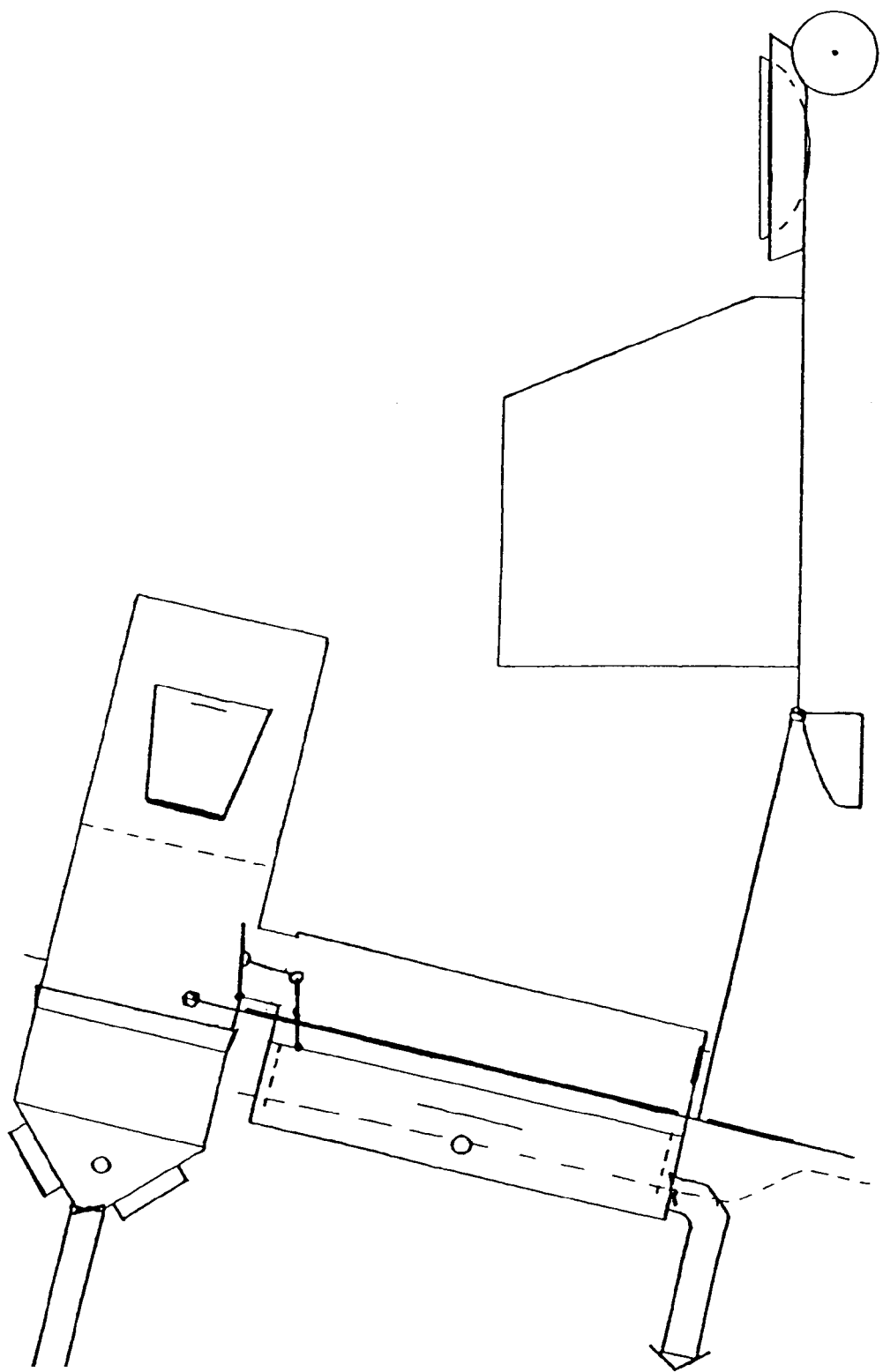
FIG. 3 is a side view of an exemplary, non-limiting embodiment of the present invention.

In FIG. 3, the outdoor cooking machine is shown in a "tipped-up" or open position to allow for easier fire-building, cleaning, and for use as an open fire pit. A hinge 40 allows the horizontal smoker/grill A and vertical smoker/grill B to be swiveled in relation to the base 74. The hinge 40 is attached to the base 74 between the braces 72 and a pair of vertical supports 76. In this tipped-up position the brace 72 assists in stabilizing the outdoor cooking machine.

As depicted in FIG. 2B, a storage cabinet D and a vertical smoker/grill base 78 are attached to the base 74. The storage cabinet D is optionally provided, and has a handle or latch 52. The storage cabinet D is intended to hold most of the removable accessories of the outdoor cooking machine.

Preferably accessories of this type which do not fit into the storage cabinet D are attached to the back side of the storage cabinet D (for easy access) or elsewhere, using hooks or other devices. The vertical smoker/grill base 78 includes inverted cone-shaped guides 48 which guide the vertical smoker/grill B onto the vertical smoker/grill base 78 when the vertical smoker/grill B is being lowered from the tipped-up position shown in FIG. 3.

The vertical smoker/grill base 78 includes a rim adapted to hold a bowl-shaped firepan 114 a predetermined height above the ground upon which the outdoor cooking machine rests. A damper 36 is located in the center bottom of the firepan 114. The firepan 114 defines a first level B1. Optionally, the firepan 114 could be permanently attached to the vertical smoker/grill base 78, preferably in conjunction with an easily accessible handle to work the damper 36 more easily than when the firepan 114 is sitting loosely; however, this fixed alternative would complicate access to the firepan 114 for ease of cleaning or firebuilding. Therefore a removeable firepan 114 is preferred, though a permanently attached bowl-shaped bottom cover at the first level B1 would hold the firepan 114 and might facilitate a more easily worked damper 36 while still allowing the firepan 114 to be removed for cleaning.

A door B4 is located above the base 78 in the side of the lower half of the vertical smoker/grill B. The door B4 is preferably top-hinged, and a hook 39 is adapted to hold the door open. However, the nature of the door B4 is not essential to the present invention and a door or doors could be provided that differ from that shown in the FIGS., such as by having a different shape or attachment/closure method, without harm to the present invention. Moreover, a second door (not shown) could be located above the door B4 to provide access to an interior area of the vertical smoker/grill B between second and third levels B2,B3. In addition, at least one air damper (not shown) could be provided at a side of the bottom of the vertical smoker/grill B to better control or add secondary air to the first level B1, though similar results might be obtained by partially or wholly opening the door B4 as needed.

An internal ring 80 is located inside the vertical smoker/grill B slightly above the door B4. The internal ring 80 is adapted to hold a firepan 114 or the like and defines a second level B2.

Figure 8:
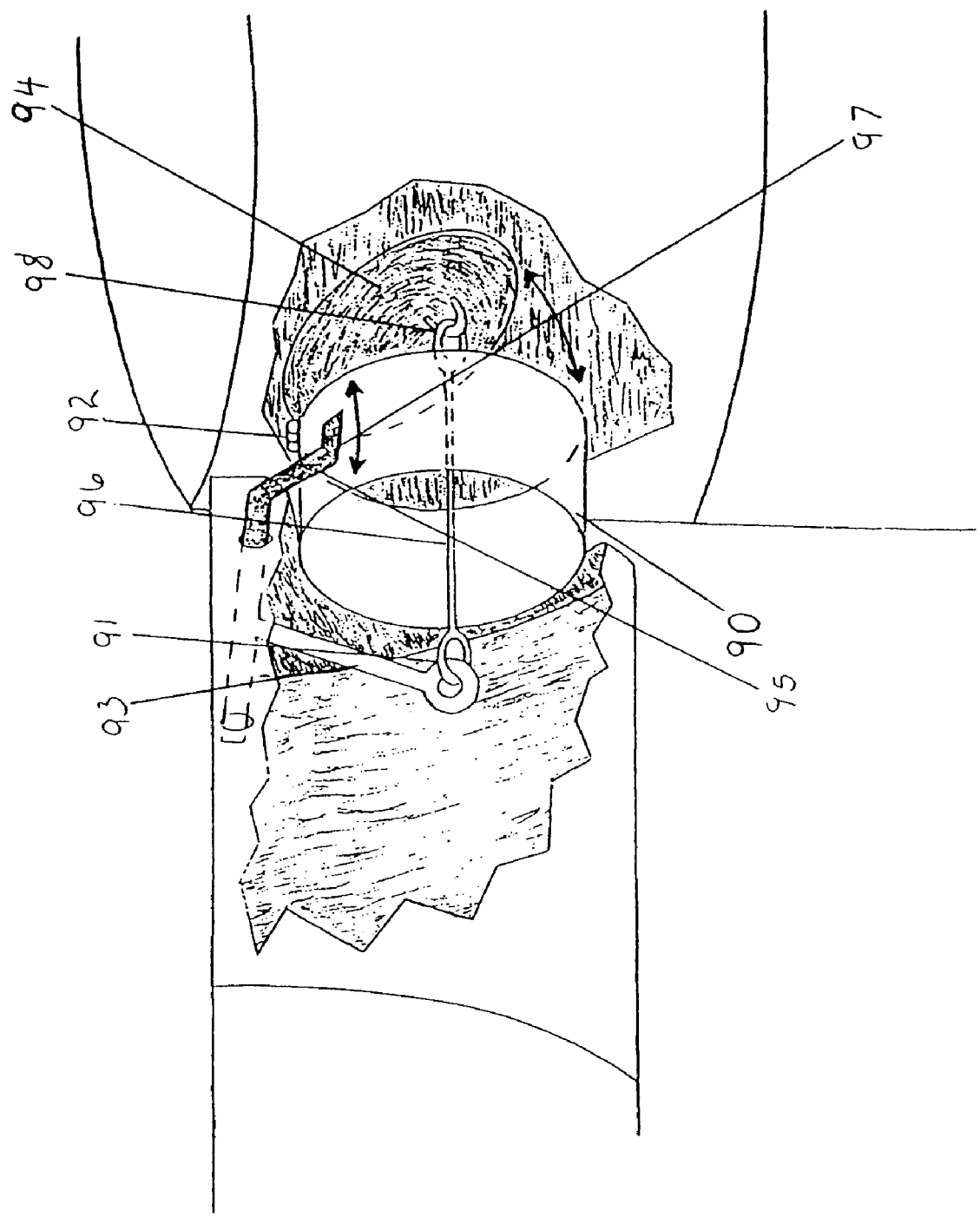
FIG. 8 is a partial side view of an exemplary, non-limiting embodiment of the present invention.

Above the second level B2, a tube with a damper 38, depicted in more detail in FIG. 8, provide communication between the vertical smoker/grill B and the horizontal smoker/grill A and will be discussed in more detail later. A handle 46 is attached to the outside of the vertical smoker/grill B on a side opposite the damper 38 and is adapted to facilitate the tipped-up position shown in FIG. 3. The top of the vertical smoker/grill B is located above the damper 38.

Figure 9:
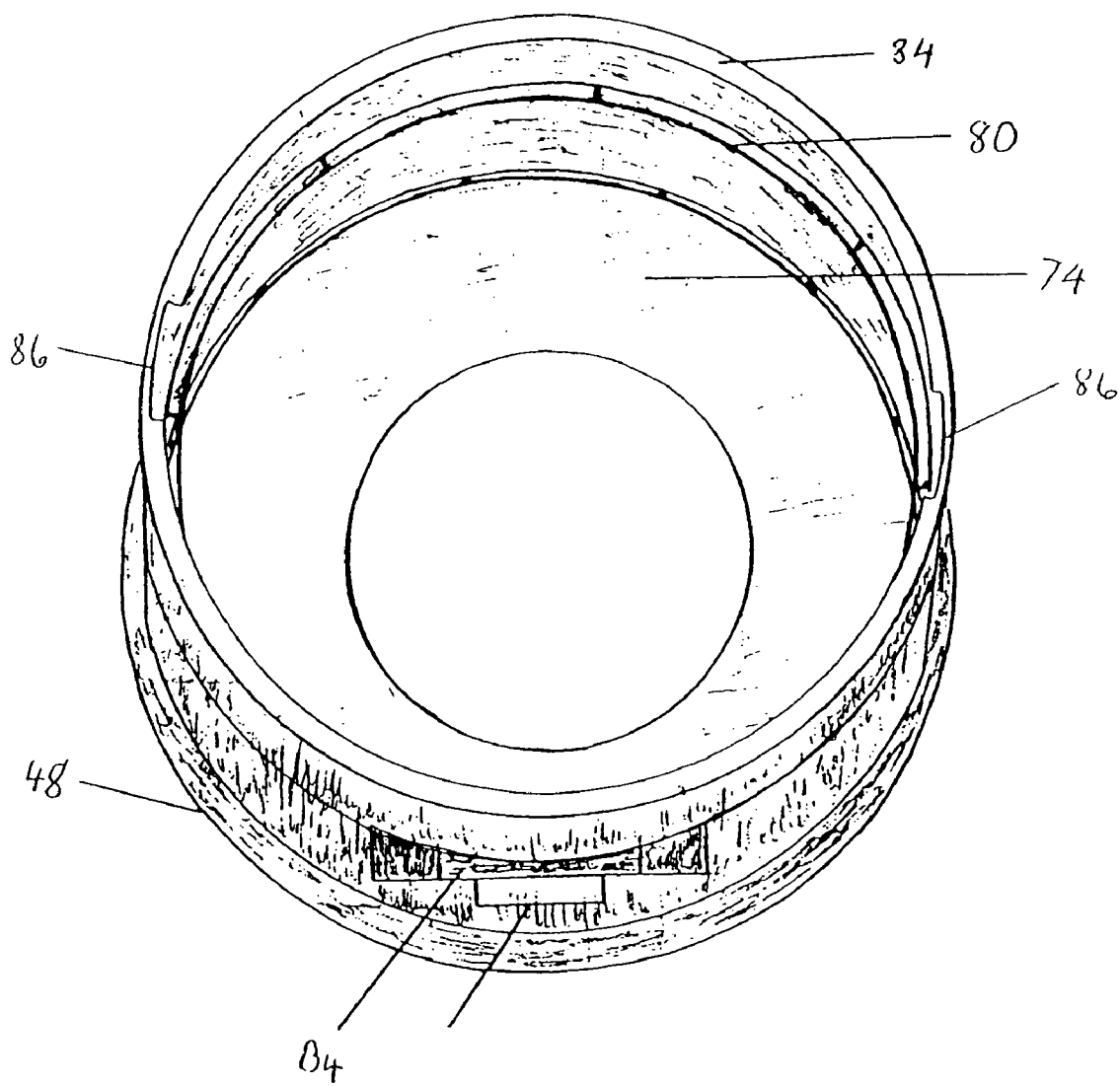
FIG. 9 is a partial top view of an exemplary, non-limiting embodiment of the present invention.

A rim 84 is located atop the vertical smoker/grill B and defines a third level B3, as shown in FIG. 2B. The rim 84 is adapted to hold a firepan 114 or the like. FIG. 9 illustrates an exemplary embodiment of the present invention including grooves 86 in the rim 84 which allow the firepan 114 or other member to be lowered to the second level B2 from the first level B3.

Figure 6A:
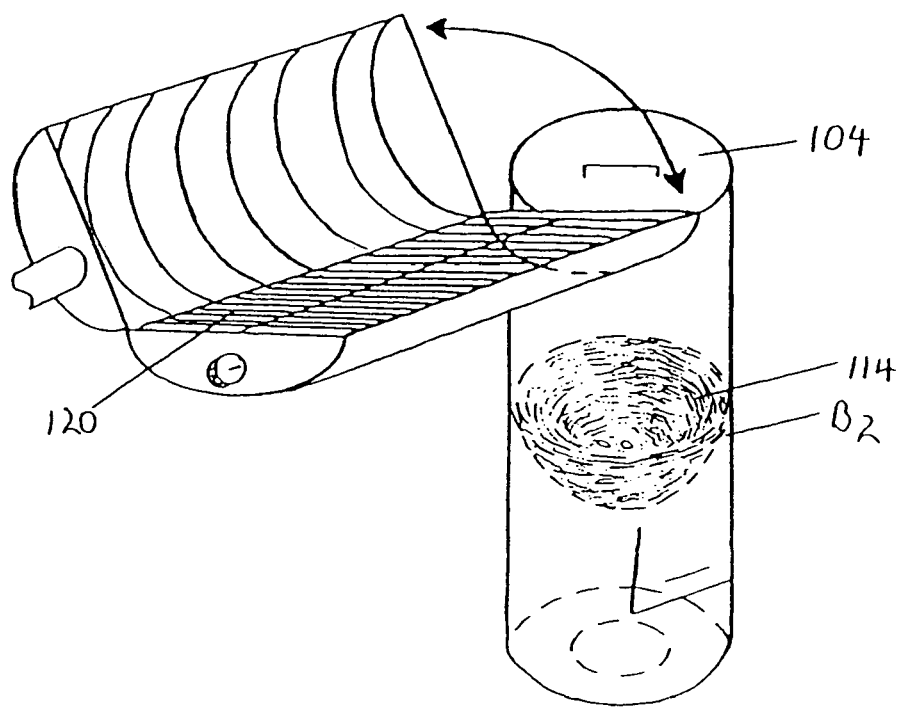
FIG. 6A is a partial side view of an exemplary, non-limiting embodiment of the present invention.
Figure 6B:
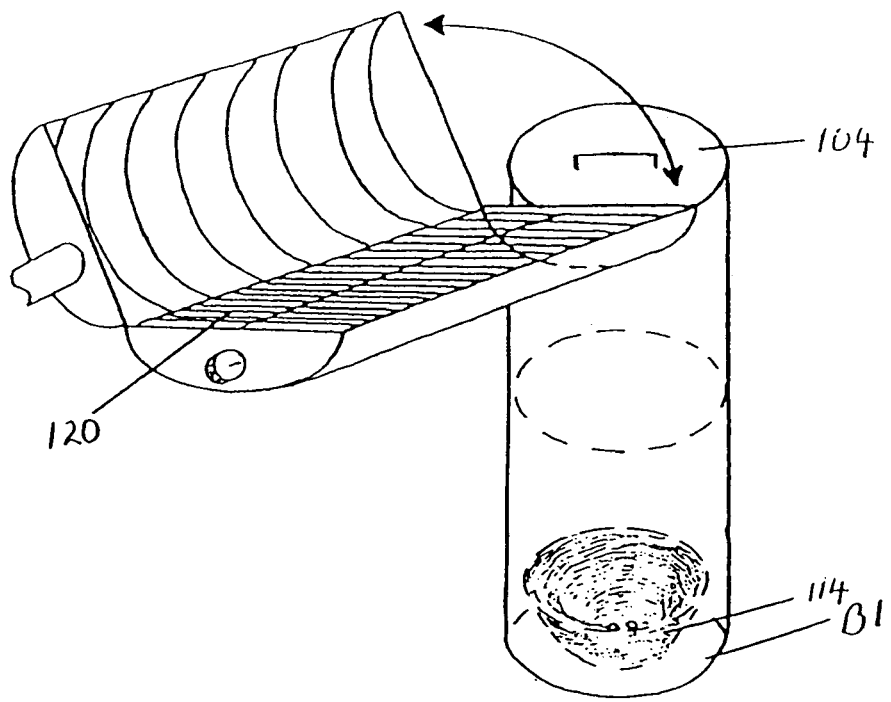
FIG. 6B is a partial side view of an exemplary, non-limiting embodiment of the present invention.
Figure 6C:
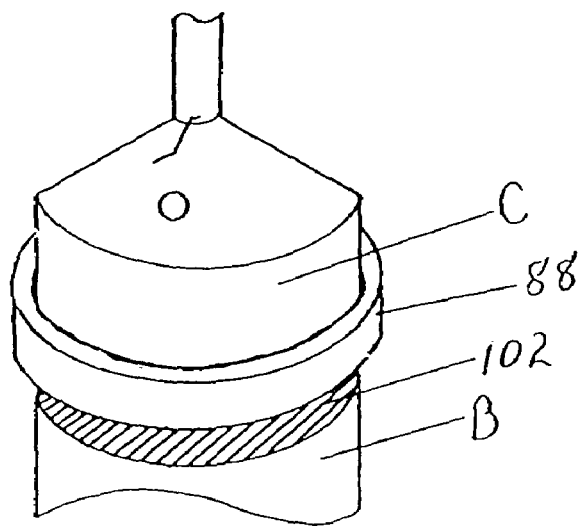
FIG. 6C is a partial side view of an exemplary, non-limiting embodiment of the present invention.

FIG. 2A shows a smoker hood C, illustrated in close-up in FIG. 6C, placed atop the vertical smoker/grill B. The smoker hood C includes a cylindrical vertical section which allows for cooking equipment and techniques which require extra room to be used with the present invention, such as, but not limited to, the stacked grates 102,102a, chicken holder 116, and dutch oven 118,118a shown in FIG. 4 and discussed below, or any other suitable cooking equipment. The smoker hood C includes an inverted cone-shaped funnel-like section attached to the top of the cylindrical vertical section. A thermometer 58 is installed in the main body of this funnel-like section.

A smoke damper 34 is placed at the smallest diameter portion of the funnel-like section. The smoke damper 34 includes an outside handle, the angle of which matches the angle of the inside damper to allow the cook to see the damper positioning, in a known manner. Above the smoke damper 34, the funnel-like section becomes a stack-like chimney 57, the length of which determines the amount of induced air which can be drawn through the vertical smoker/grill B. A chimney top 56c is attached to the top of the chimney 57 to keep rain out of the chimney 57. Handles 60 are provided to assist lifting of the smoker hood C away from the vertical smoker/grill B.

Returning to FIG. 8, a tube 90 connects the vertical smoker/grill B to the horizontal smoker/grill A. The tube 90 is depicted as being round or oval, but may be of any suitable cross-sectional shape. A hinge 92 is attached to the top of the tube 90 at an intersection of the tube 90 and the vertical smoker/grill B and to a coverplate 94 which is curved to match the inside of the vertical smoker/grill B. One end of a bar 96 is attached to a central portion of the coverplate 94 with a moveable joint 98. The other end of the bar 96 is attached to a handle piece 93 with another moveable joint 91. The handle piece 93 is "T"-shaped and has a long "T" top which extends beyond the sides of the horizontal smoker/grill A and is installed just inside the horizontal smoker/grill A. The handle piece 93 has a handle arm 95 with a handle 97 attached to the end of the "T" top which extends through to the cooking/operating side of the outdoor cooking machine. The handle 97 is put on the same angle as the coverplate 94 to communicate to the cook the position of the coverplate 94 when hoods of the outdoor cooking machine are in a closed position.

Figure 5A:
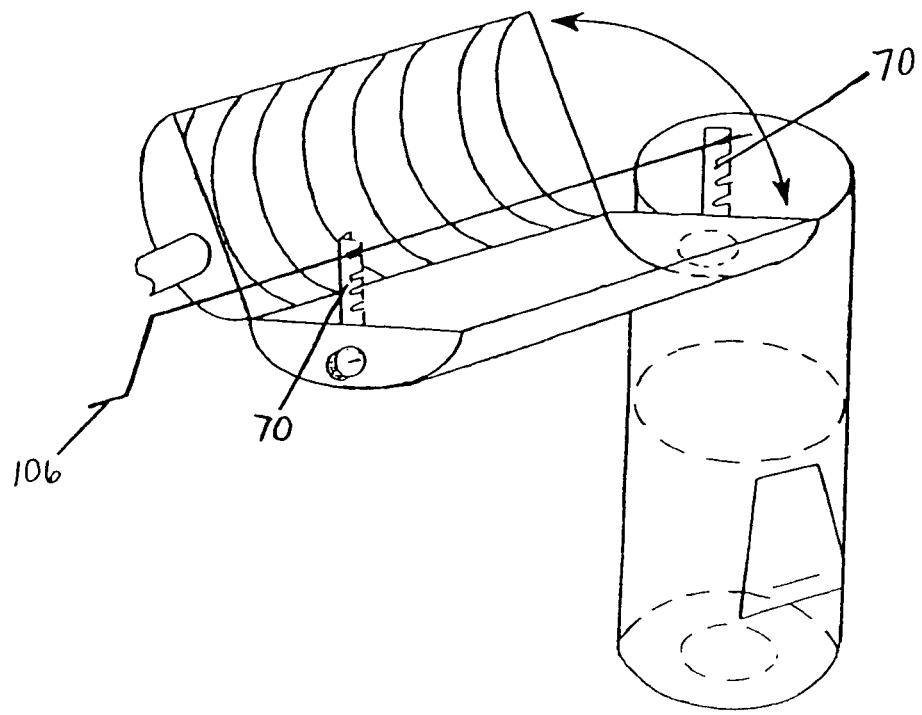
FIG. 5A is a partial side view of an exemplary, non-limiting embodiment of the present invention.
Figure 5B:
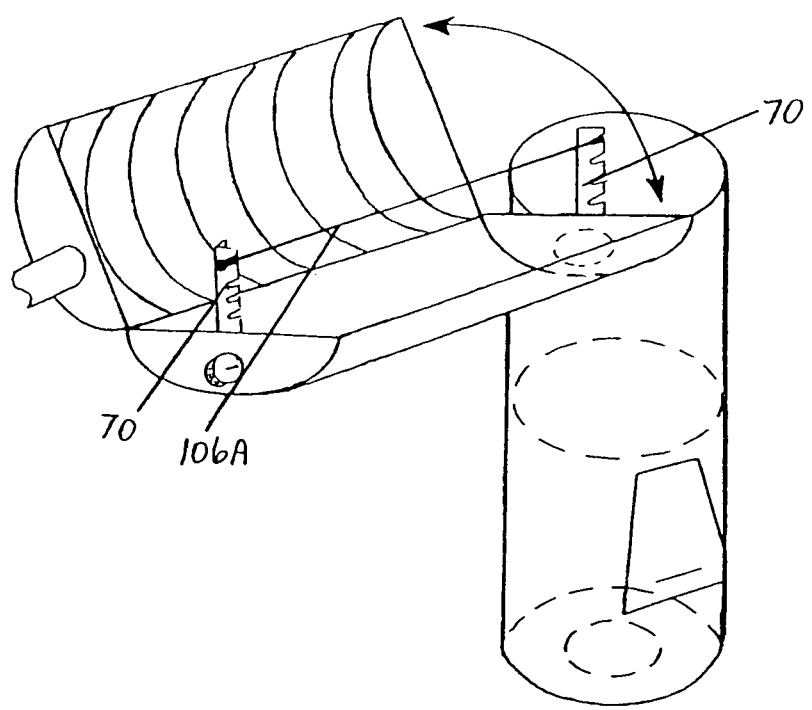
FIG. 5B is a partial side view of an exemplary, non-limiting embodiment of the present invention.

The horizontal smoker/grill A is attached to the vertical smoker/grill B through the damper 38. Another damper 32 is located in a lower half of the horizontal smoker/grill A at an opposite end of the horizontal smoker/grill A from the damper 38. The horizontal smoker/grill A is preferably dimensioned to allow for at least two simultaneous fires therein. A removable rectangular grate 120 is located in an approximately middle position within the horizontal smoker/grill A, just below a hood A3. The rectangular grate 120 rests on a ledge just above two fire areas A1 and A2 within the horizontal smoker/grill A. Racks 70 are located on each end of the horizontal smoker/grill A. The racks 70 may be permanently attached or moveable, and are adapted to hold spit sticks 106,106a, through the use of four angled slits in each rack 70, as shown in FIGS. 5A and 5B. A tube (not shown) may be located opposite a cooking side of the horizontal smoker/grill A to store the spit sticks 106,106a when not in use. The hood A3 includes a chimney 55, the length of which determines the amount of smoke- and airflow through the horizontal smoker/grill A. Though the chimney 55 is shown as extending from a side of the hood A3, the location of the chimney 55 is not essential to the present invention and can easily be located by one of ordinary skill in the art for optimal heat/smoke flow through the outdoor cooking machine. A damper 30 is located at the base of the chimney 55. A chimney top 56a is located at the top of the chimney 55. The hood A3 has a handle 60 on the cooking/operating side of the horizontal smoker/grill A and is hinged on an opposite side. A thermometer 58 is located in an upper middle portion of the hood A3 so as to be read from the cooking/operating side.

As shown in FIG. 1, an exemplary embodiment of the present invention includes a table 66 attached to the cooking/operating side of the horizontal smoker/grill A. Preferably, the table 66 is collapsible for ease of storage. Additionally, a fixed table 64 may be located between handles 62 on a side of the horizontal smoker/grill A opposite the vertical smoker/grill B. The handles 62 may double as rests for the tipped-up portion of the outdoor cooking machine when in an opened or tipped-up position, and the handles 62 are preferably located opposite the wheels 44 to assist in moving the outdoor cooking machine.

Figure 4:
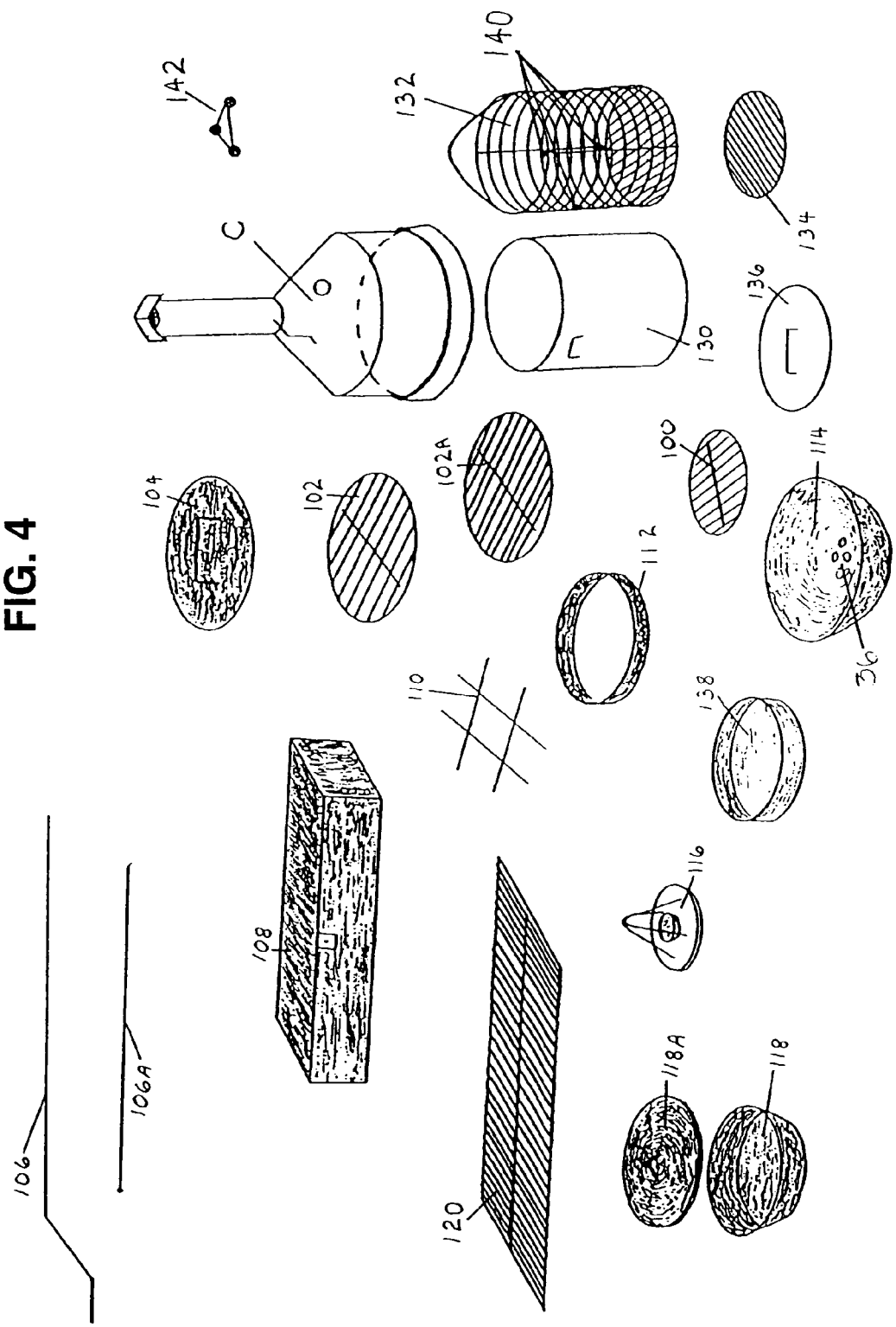
FIG. 4 depicts multiple accessories for use with an exemplary, non-limiting embodiment of the present invention.

FIG. 4 depicts a sampling of specialized accessories to facilitate different cooking techniques with the outdoor cooking machine. The hood C, previously discussed, fits atop the vertical smoker/grill B. Multiple circular grates 102 may be used in conjunction with a spacer 112 to increase cooking surface area within the vertical smoker/grill B. The spacer 112 is a tube with a slightly smaller diameter than that of the grates 102 and may be approximately two inches long.

A potholder 110 is small enough to fit inside the vertical smoker/grill B but long enough to rest on the ring 80 of the second level B2. A pot 130 is small enough to just fit inside the vertical smoker/grill B, with approximately an inch clearance all around. A lid 136 goes with the pot 130. As an alternative to the potholder 110, the pot 130 could be provided with elongated handles (not shown) which would rest upon the rim 84 of the third level B3 and thereby suspend the pot 130 within the vertical smoker/grill B. No potholder 110 is necessary if a grate 102,102a is provided which can rest inside the vertical smoker/grill B at the second level B2 and if such grate is strong enough to withstand the heat and weight of a full pot 130 resting thereupon.

No matter how the pot 130 is arranged within the vertical smoker/grill B, a basket 132 is adapted to fit inside the pot 130, and a grate 134 is adapted to rest upon protrusive holders 140 within and about halfway down the basket 132.

A firepan 114 is large enough to rest on the ring 80 at the second level B2 without falling through the ring 80, or to similarly rest upon similar rings or rims at first and/or third levels B1, B3. As mentioned earlier, the firepan 114 is bowl-shaped with a damper 36 located in a bottom center portion of the firepan 114.

A waterpan 138 is sized to fit inside the vertical smoker/grill B and rest upon the ring 80 at the second level B2. The waterpan 138 is circular with sides approximately three inches high and adapted to hold water. Potlifter 142 is adapted to fit inside the waterpan 138 and beneath the pot 130, to raise the pot about an inch from the bottom of the waterpan 138 and thereby provide a double boiler function using the waterpan 138 and the pot 130. Instead of using the potlifter 142 and a circular waterpan 138, the waterpan 138 could optionally be made as a six- or eight-sided polygon, turned so that a smaller diameter is presented and lowered down through the top of the vertical smoker/grill B, and then placed so that the larger diameter corners rest upon the rim 80 of the second level B2. In such case, the grooves 86 would not have to be made large enough for insertion of the waterpan. Another optional and exemplary embodiment of the waterpan 138 would involve a top or lid (not shown) for the waterpan 138 adapted to hold, and create a tight seal with, the pot 130 such that the pot 130 is suspended in the water without touching the waterpan 138.

A top cover 104 is sized to cover the third level B3 while still fitting inside the hood C. A circular grate 100 fits within the firepan 114 to create about a one-inch space from the bottom center portion of the firepan 114 to the circular grate 100. A known chicken device 116 is used for cooking chicken. A known dutch oven 118 and dutch oven lid 118a are sized to fit inside the vertical smoker/grill B. The aforementioned rectangular grate 120 is sized to fit inside the horizontal smoker/grill A. A rectangular dutch oven 108, preferably including an attached hinged lid, is sized to fit inside the horizontal smoker/grill A under the hood A3, resting upon the rectangular grate 120 and allowing clearance for the hood A3 to close. Optionally, the rectangular dutch oven 108 could have a separate lid, or could have a lid adapted to hold coals atop the rectangular dutch oven 108 in a known manner. A spit stick 106 is pointed at one end and has an offset arm and handle at the other end. The spit stick 106 is long enough to extend beyond both racks 70, such that the offset arm and handle extend past the table 64 of the horizontal smoker/grill A. A shorter spit stick 106a is shaped like a large nail, with a head at one end and a point at the other. The shorter spit stick 106a is just shorter than the hood A3. The spit sticks 106,106a have squared rods so as to better hold food as the spit sticks 106,106a are rotated, by hand or via a mechanical turner.

The exact nature of the dampers of the present invention is not essential to the invention, though having the dampers themselves is very important for control of airflow through the outdoor cooking machine. The specific dampers depicted were chosen to withstand the heat of cooking, for ease of use, and to apprise the cook at a glance of the position of the dampers within the outdoor cooking machine.

The horizontal smoker/grill A and the vertical smoker/grill B are depicted as being connected into a single unitary outdoor cooking machine. The horizontal smoker/grill A and the vertical smoker/grill B could instead be detachable, but the unitary construction provides advantages in avoiding heat/smoke leaks at the connection in the area of the damper 38.

The wheels 44 of the outdoor cooking machine could be detachable or else simply not be provided for a desired application—perhaps commercial—of the outdoor cooking machine. However, wheels 44 are preferred for most applications, since the cook might wish to have the option of mobility of the outdoor cooking machine.

The present invention is not restricted to a single horizontal smoker/grill A and a single vertical smoker/grill B; for instance, a second horizontal smoker/grill or even a simple warming box with no fire area (neither of which are shown in the FIGS.) could be provided on a side of the vertical smoker/grill A opposite the pictured horizontal smoker/grill A without harm to the present invention.

INDUSTRIAL APPLICABILITY

The outdoor cooking machine offers a variety of outdoor cooking techniques, which can be used alone or in any suitable configuration. This variety is provided by use of the horizontal smoker/grill A and the vertical smoker/grill B. Examples of possible cooking techniques which may be provided, among others, are listed below, with a more detailed description of several cooking techniques following:

Chart 1: Examples of Outdoor Cooking Techniques Available:

| Horizontal smoker/grill A | Vertical smoker/grill B |
|---|---|
| conventional grilling. (multiple fires may be used to provide multiple temperatures) | conventional grill (fire may be different temperature than the fire(s) in horizontal smoker/grill A |
| spit or rotisserie cooking | double boiling |
| cold smoking | stew or chili pot |
| food warming | open fire pit |
| baking (oven) | hot smoking |
| table top | deep frying |
|  | outdoor fireplace |
|  | baking (oven) |
|  | steaming |
|  | table top |

Not all cooking technique options provided by the horizontal smoker/grill A can be used with every cooking technique option provided by the vertical smoker/grill B. However, each cooking technique option provided by the horizontal smoker/grill A can be used in combination with at least one cooking technique option provided by the vertical smoker/grill B, and vice versa. In describing the cooking techniques, wood is given as an example of a suitable fuel, but the outdoor cooking machine could use any desired fuel, such as wood, charcoal, gas, wood pellets, or the like, and could also use a smoker box in a known manner to provide aromatic smoke for a desired flavor of smoked food.

The horizontal smoker/grill A may be used as a traditional grill when at least one fire is built in the bottom of the horizontal smoker/grill A, optionally in fire areas A1 and A2 (these fires may be of differing temperatures for cooking different foods). For this application, the rectangular grate 120 is placed above the fire areas A1 and A2, as shown in FIGS. 6A and 6B. The hood A3 may be lowered as in a traditional grill to contain heat, using the handle 60. When the hood A3 is lowered, the thermometer 59 and damper 30 are available for the cook's use. Dampers 32 and 38 may be manipulated to control air supplied to the fire(s).

The horizontal smoker/grill A may also be used as a spit or rotisserie cooker in a similar fashion, with at least one fire in the fire areas A1 and A2, and the rectangular grate 120 can optionally in place as above. Either a long spit stick 106 or a short spit stick 106a may be used in a known manner to rotisserie-cook food. When the long spit stick 106 is used, as in the FIG. 5A exemplary embodiment, the hood A3 stays open and the long spit stick 106 may be rotated by hand, continuously if desired. When the short spit stick 106a is used, as in the FIG. 5B exemplary embodiment, the hood A3 may be lowered to retain heat, but must be raised for the food to be rotated. The rotisserie function may also or instead be provided in any other known manner, either hand-powered or motor-driven.

Figure 7:
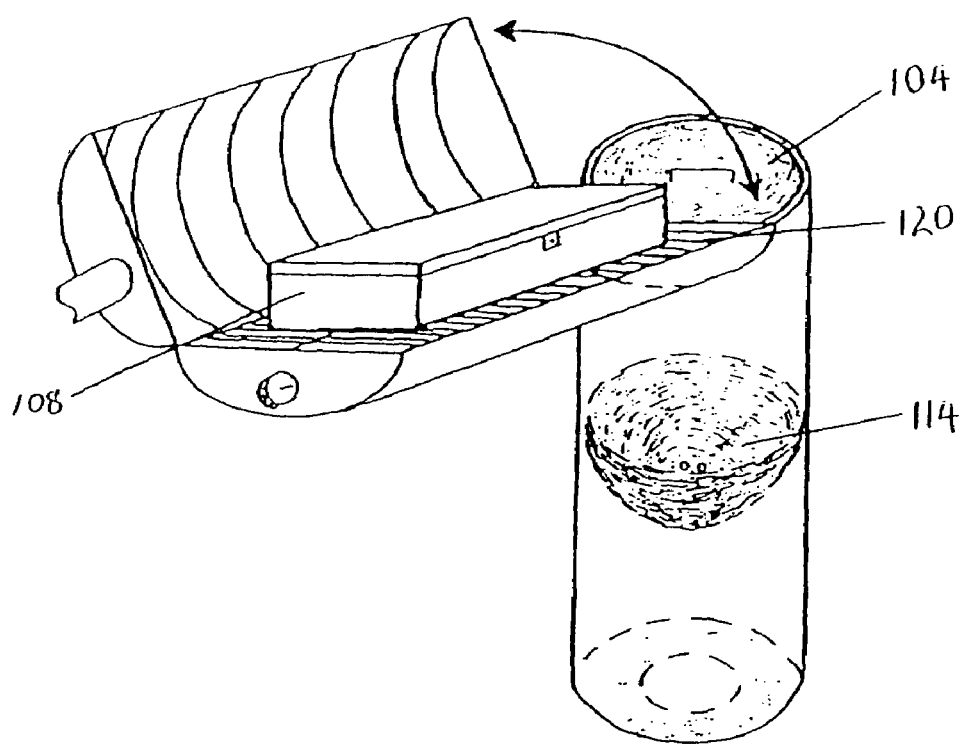
FIG. 7 is a partial side view of an exemplary, non-limiting embodiment of the present invention.

The horizontal smoker/grill A may be used as an oven, cold/slow smoker, or food warmer. For these and similar functions, smoke and/or heat is directed from a fire in the vertical smoker/grill B through the damper 38 to the horizontal smoker/grill A in a desired manner. The fire is built in a firepan 114 located on at least one of first and second levels B1, B2, as shown in the exemplary embodiments of FIGS. 6A and 6B. The damper 36 assists in controlling primary airflow to the fire. The cover 104 or hood C assists in routing heat and smoke from the vertical smoker/grill B to the horizontal smoker/grill A. The rectangular grate 120 is in place, as described above, in the horizontal smoker/grill A. For use of a baking cooking technique as shown by the exemplary embodiment of FIG. 7, the elongated dutch oven 108, containing the food to be baked, may be placed on the rectangular grate 120. If a slow/cold smoking or warming cooking technique is to be used also or instead, the food may be placed directly on the rectangular grate 120. Depending upon how hot the fire in the firepan 114 is and how hot the dutch oven 108 in the horizontal smoker/grill A needs to be, the oven feature may not function as exactly as desired, but improved function may be provided by experimentation in a particular application. A fire may optionally be built in the horizontal smoker/grill A to supplement the heat and smoke supplied from the vertical smoker/grill B.

The horizontal smoker/grill A may also be used to provide additional table space, through simply using the rectangular grate 120, installed as above, as a flat tabletop surface.

Figure 10:
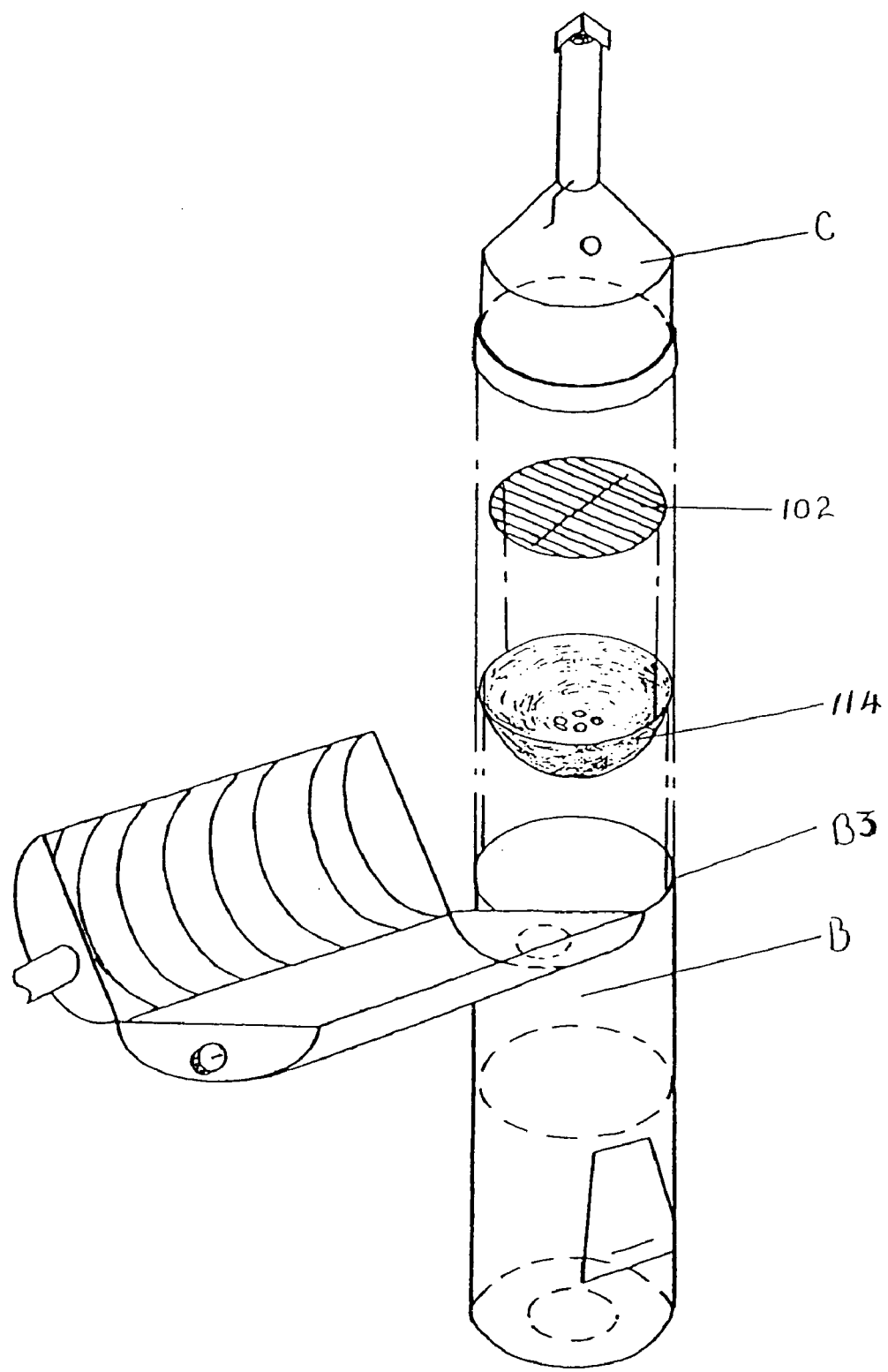
FIG. 10 is an exploded partial side view of an exemplary, non-limiting embodiment of the present invention.

The vertical smoker/grill B may be used as shown in the exemplary embodiment of FIG. 10, as a traditional grill. A fire in the firepan 114 is placed on the third level B3, and the grate 102 is placed above the firepan 114. The hood C may optionally be placed atop the grate 102 to retain heat and/or provide the damper 34 and thermometer 58 for the cook's use. When the firepan 114 is placed on the third level B3, the damper 36 on the bottom of the firepan 114 may be easily reached and adjusted to control the airflow to the fire. However, the firepan 114 may also or instead be placed on first or second levels B1,B2 to provide a modified traditional grill as desired, or as required for some cooking combinations with the horizontal smoker/grill A.

Figure 14A:
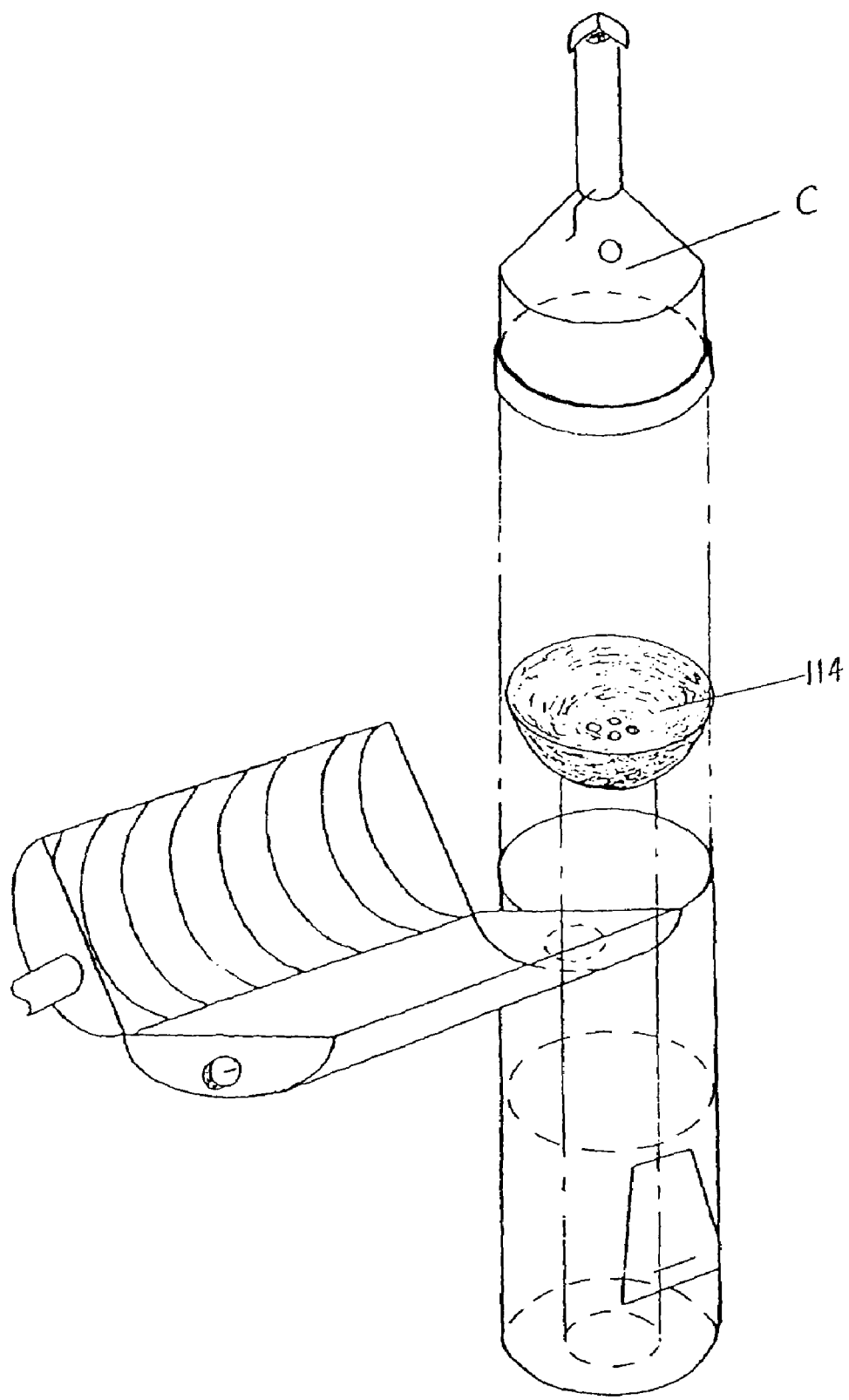
FIG. 14A is an exploded partial side view of an exemplary, non-limiting embodiment of the present invention.
Figure 14B:
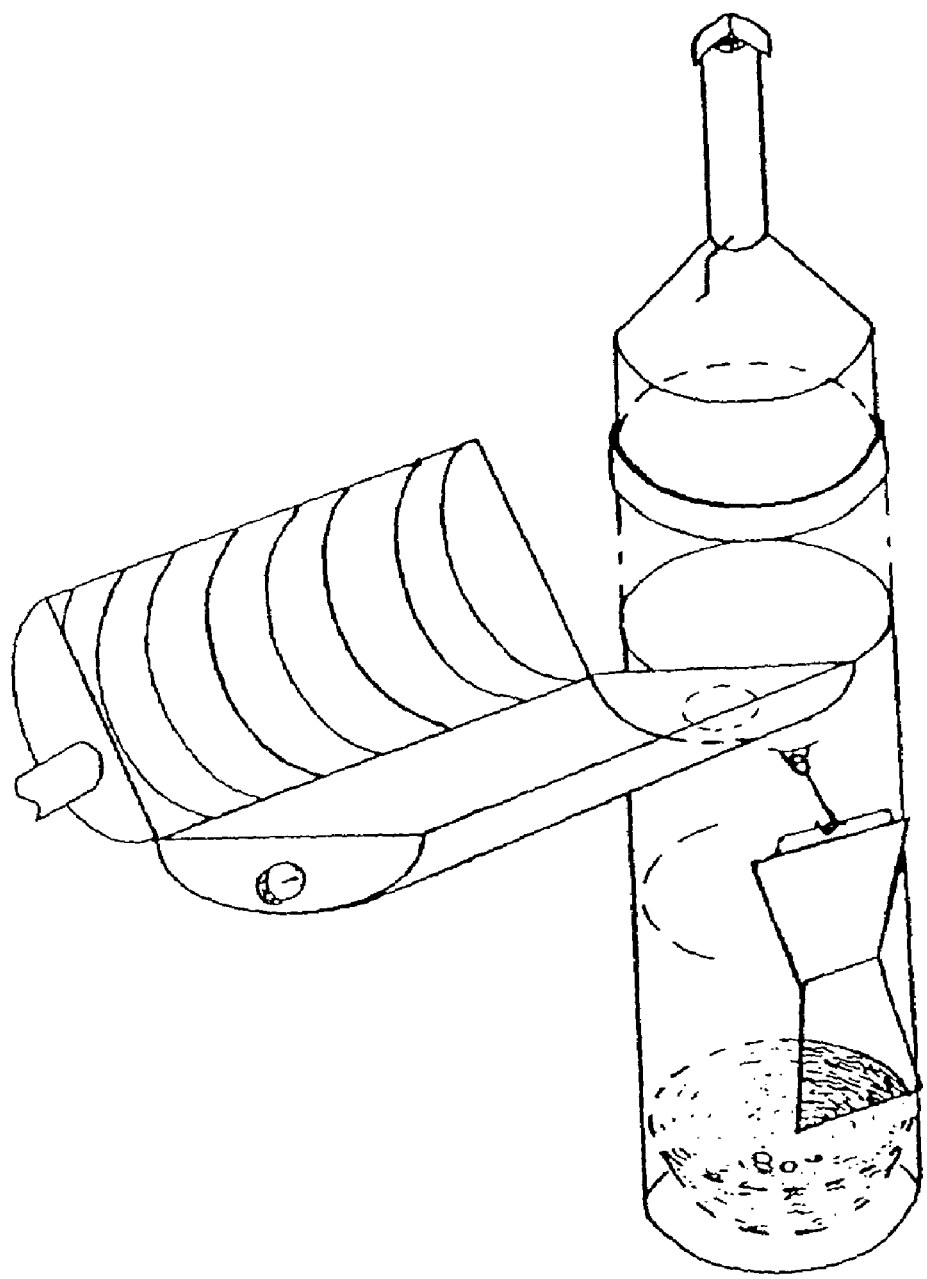
FIG. 14B is a partial side view of an exemplary, non-limiting embodiment of the present invention.

The vertical smoker/grill B may also be used as an open fire pit by simply supplying a fire in the firepan 114 at the first level B1 while the outdoor cooking machine is in the tipped-up position illustrated in FIG. 3. This option causes the outdoor cooking machine to function like a traditional open fire pit and allows, for example, hot dogs on a stick to be cooked in a known "primitive" fashion. An outdoor fireplace cooking technique may be supplied similarly, with a fire being built in a firepan 114 on the first level B1, using the damper 36 as needed, while the outdoor cooking machine is in the tipped-up position. This arrangement is shown in the exemplary embodiment of FIGS. 14A and 14B. Once the fire is burning as desired, the outdoor cooking machine is returned to the closed position and hood C is placed on the vertical smoker/grill B. The damper 34 can then be operated as needed much like a damper in an ordinary fireplace. Additional fuel may be supplied to the fire through the door B4, optionally held open by a hook 39 or other hold-open device, as shown in the exemplary embodiment of FIG. 14B, and the fire may be observed through this door B4. Also, the door B4 could be closed, allowing the outdoor cooking machine to be used as a heater.

Note that one or more doors (not shown) could be provided to place the firepan 114 at a desired position within the vertical smoker/grill B while maintaining the outdoor cooking machine in a closed position instead of the tipped-up position discussed herein. This exemplary embodiment, though, might result in unwanted airflow through the doors to the interior of the outdoor cooking machine and is not recommended for at least that reason. Such doors, as well as any other suitable alternate access arrangement, should nonetheless be considered interchangeable with the tipped-up position for the sake of simple reference in this description.

Figure 11:
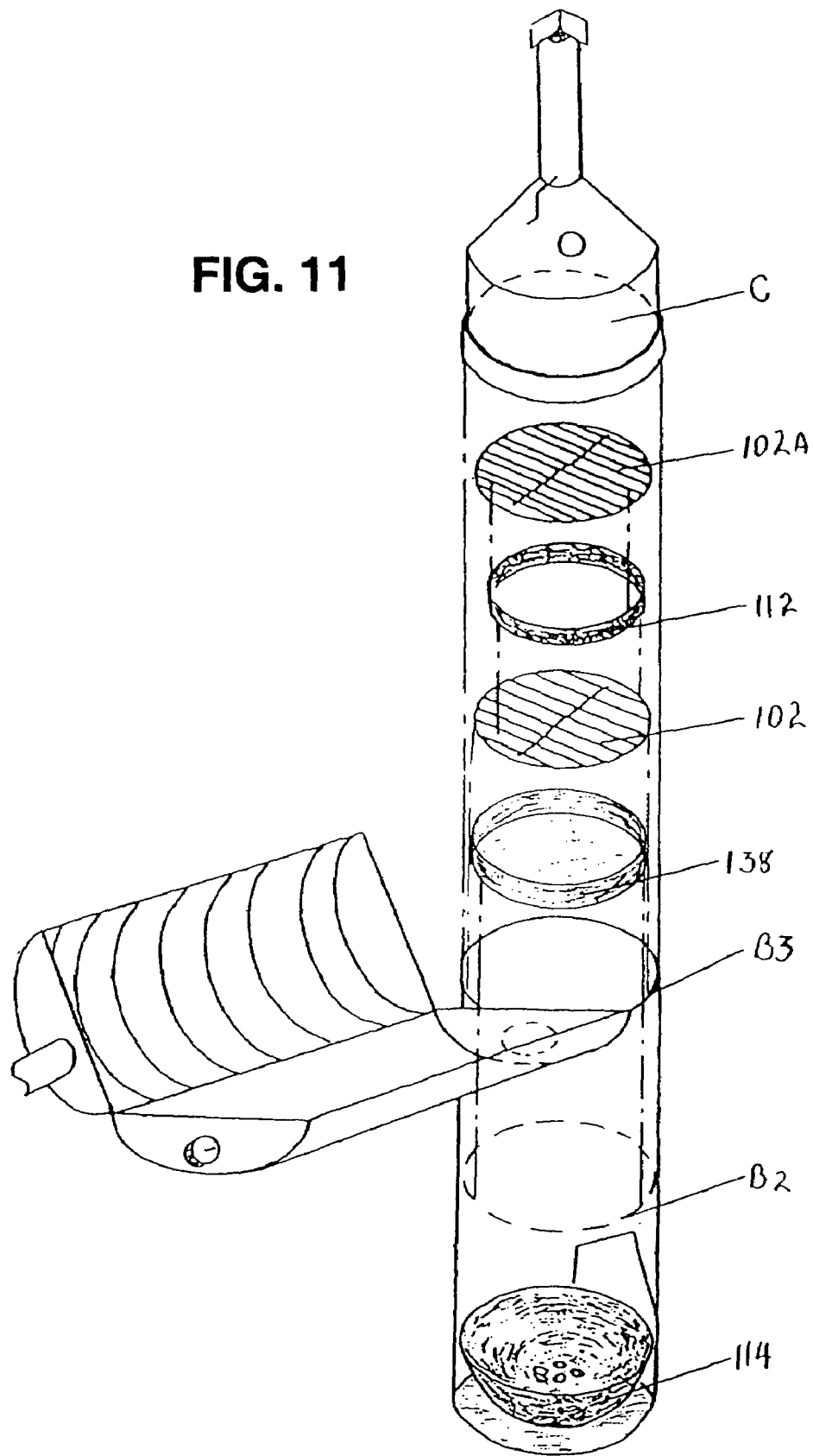
FIG. 11 is an exploded partial side view of an exemplary, non-limiting embodiment of the present invention.

The vertical smoker/grill B may be used as a hot smoker, as well, and as depicted in the exemplary embodiment of FIG. 11. To provide the hot smoking cooking technique, the outdoor cooking machine is placed in the tipped-up position and a fire is built in the firepan 114 at first level B1. The outdoor cooking machine is returned to the closed position when the fire is burning as desired. The waterpan 138 is placed on second level B2 and optionally filled with water. The grate 102 is then placed on the third level B3 to hold the food to be cooked. If additional space for holding food is desired, the spacer 112 is placed on the grate 102 and another grate 102 is stacked atop the spacer 112. Such spacer 112 and grate 102 alternation might be performed several times, as long as space within the vertical smoker/grill B allows. This optional arrangement can greatly multiply the available space for holding food. Whether or not the additional grate 102 is used, the hood C is placed atop the vertical smoker/grill B, thus allowing the thermometer 58 and damper 34 to be used by the cook. Fuel can be added to the fire and supplemental airflow can be regulated through use of the door B4.

Figure 16:
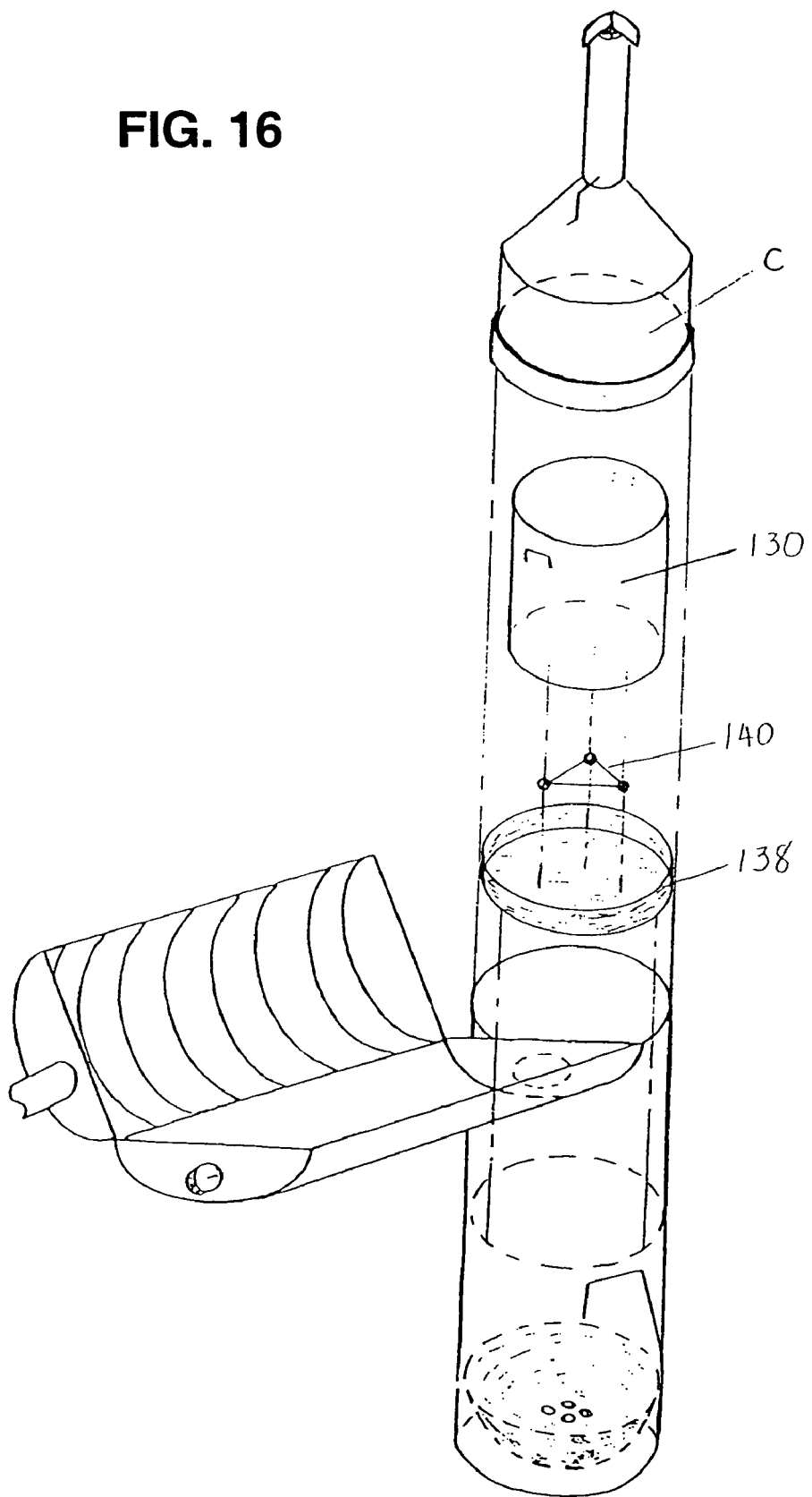
FIG. 16 is an exploded partial side view of an exemplary, non-limiting embodiment of the present invention.

The vertical smoker/grill B may also be used as a double boiler, as in the exemplary embodiment of FIG. 16. To do so, a fire is built in the firepan 114 at the first level B1 while the machine is in the tipped-up position. Once the fire is burning as desired, the waterpan 138 is placed at the second level B2, the potlifter 142 is placed in the waterpan 138, and water is added to the waterpan 138. The pot 130 is placed on the potlifter 142 and food may then be cooked in the pot 130 using the double boiling cooking technique. If desired, the hood C and/or the pot lid 136 may be used to cover the vertical smoker/cooker B or the pot 130, respectively.

Figure 12A:
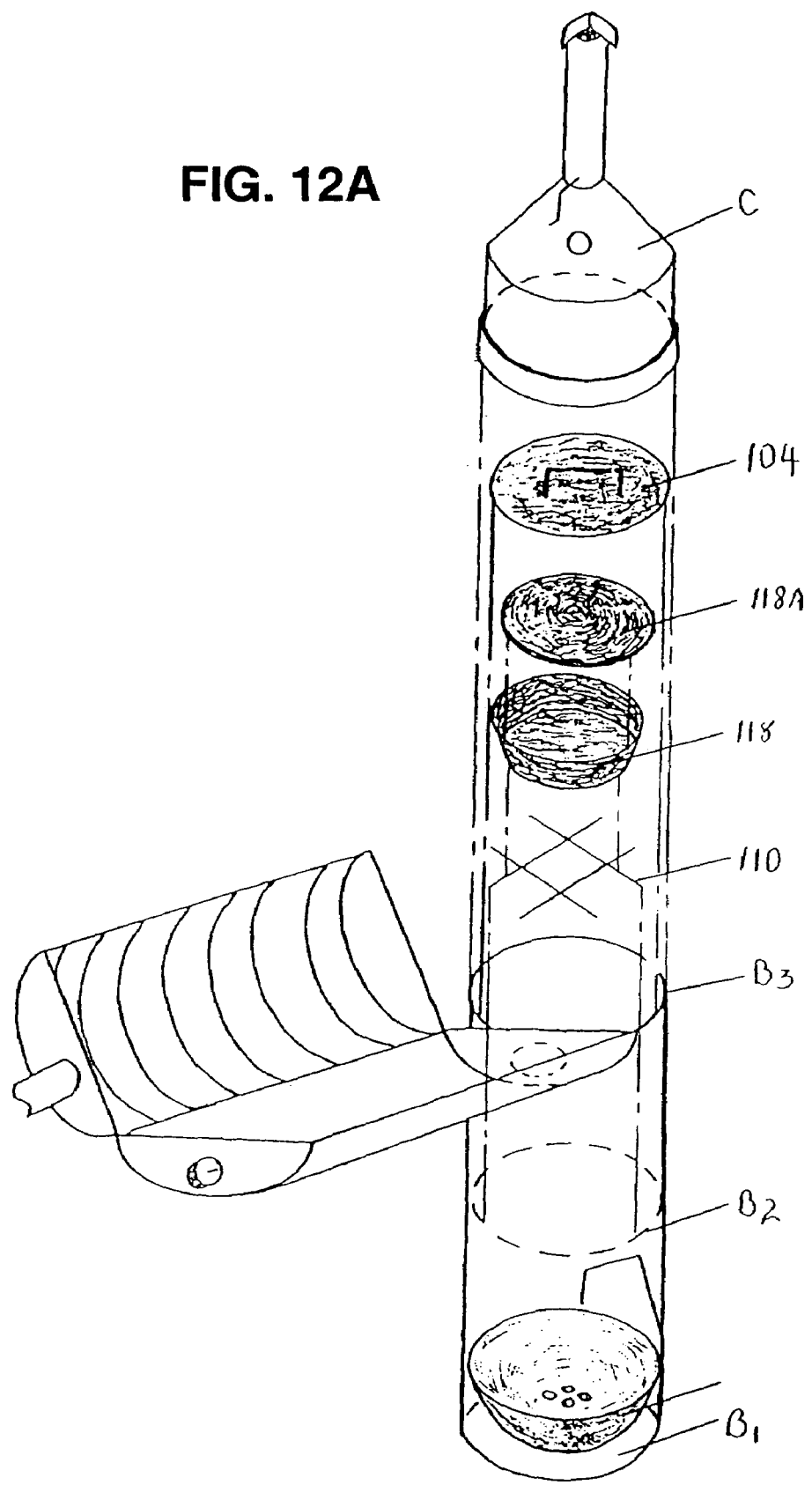
FIG. 12A is an exploded partial side view of an exemplary, non-limiting embodiment of the present invention.
Figure 12B:
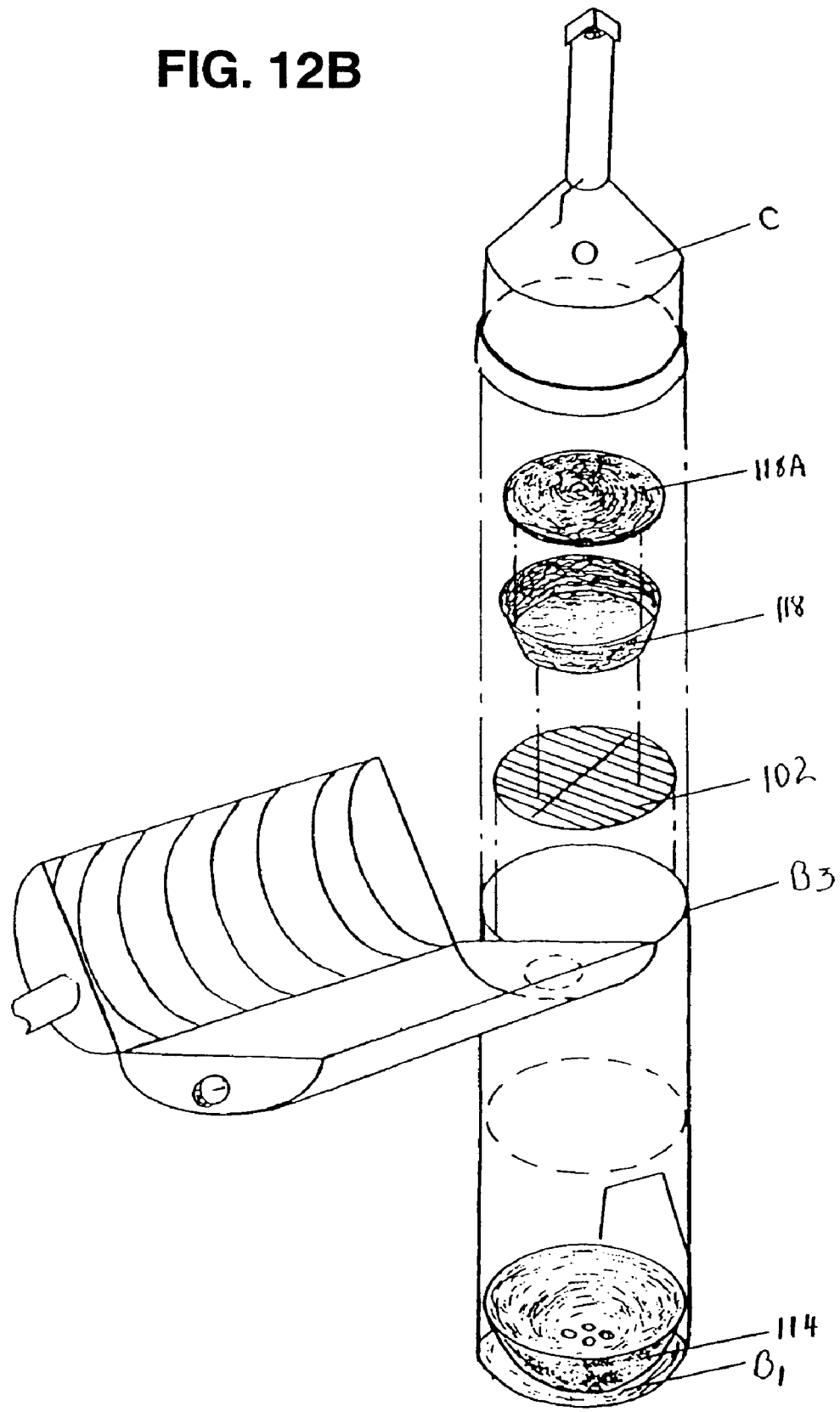
FIG. 12B is an exploded partial side view of an exemplary, non-limiting embodiment of the present invention.
Figure 15:
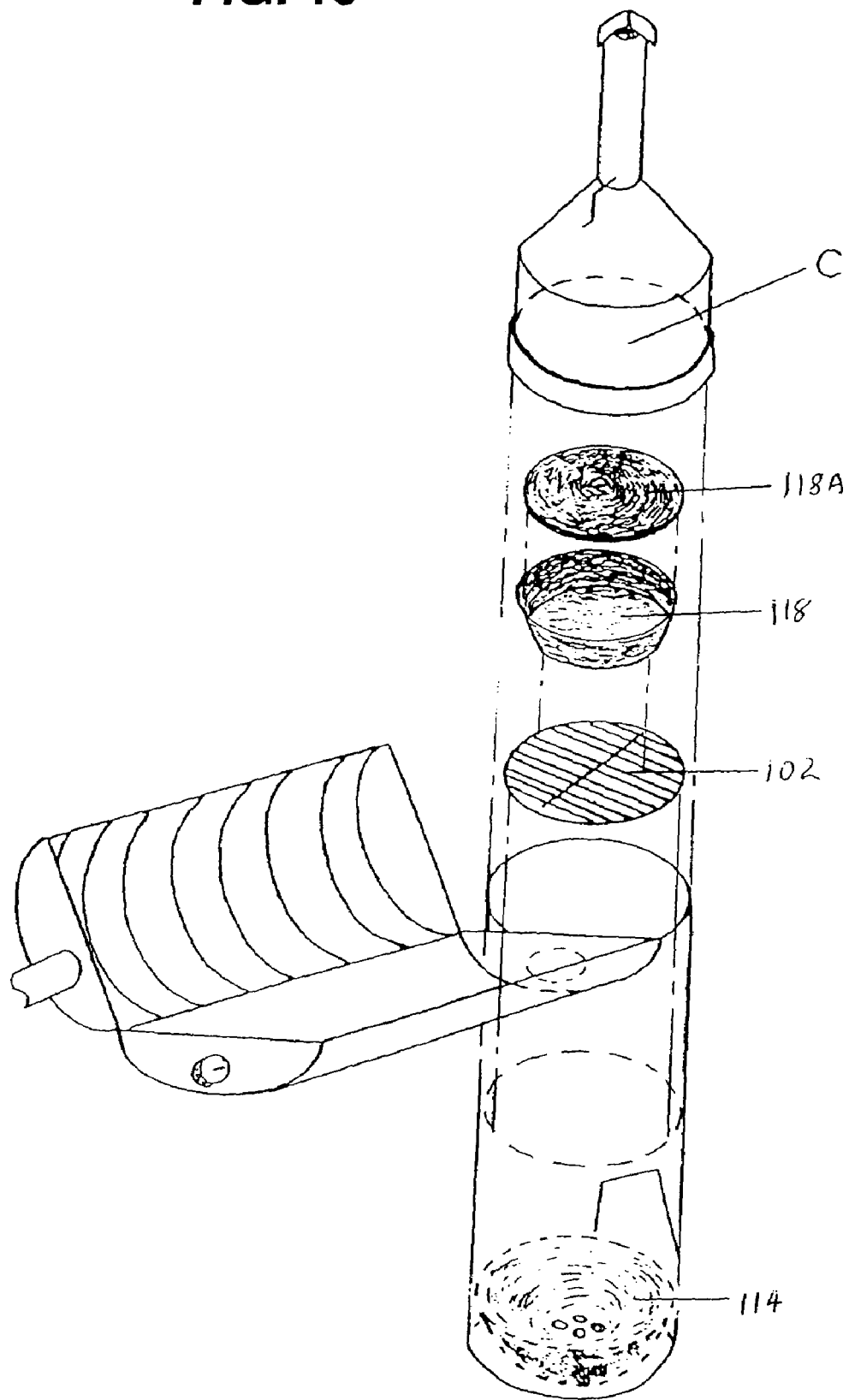
FIG. 15 is an exploded partial side view of an exemplary, non-limiting embodiment of the present invention.

The vertical smoker/grill B may be used as an oven in much the same manner as the above baking cooking technique used in conjunction with the horizontal smoker/grill A. Namely, a fire is built in the firepan 114 at first level B1, as shown by the exemplary embodiment of FIG. 12A, while the outdoor cooking machine is tipped up, then the outdoor cooking machine is closed when the fire is burning suitably. The fuel and airflow to the fire can be controlled using the door B4 and the damper 36, respectively. The potholder 110 is placed at second level B2 and the dutch oven 118,118a are placed on the potholder 110. With food in the dutch oven 118,118a, the hood C is placed atop the vertical smoker/grill B and the food is then baked. The cover 104 may be used within the vertical smoker/cooker B to retain more heat around the dutch oven 118,118a. Alternatively, the dutch oven 118,118a and the potholder 110 or grate 102 may be placed on the third level B3, with the fire in a firepan 114 at the second level B2, such arrangement depicted in the exemplary embodiment of FIG. 12B. In such case, fuel may be added to the fire through the top of the vertical smoker/cooker B, though the dutch oven 118,118a would need to be removed to add fuel in this manner. The primary air to the fire would be controlled through the damper 36 which could be reached through the door B4 in this arrangement. Finally, a grate 102 could be used to hold the dutch oven 118,118a, as shown by the exemplary embodiment of FIG. 15, instead of the potholder 110. In any arrangement, fire could be placed atop the dutch oven to provide the desired baking cooking technique.

Figure 13A:
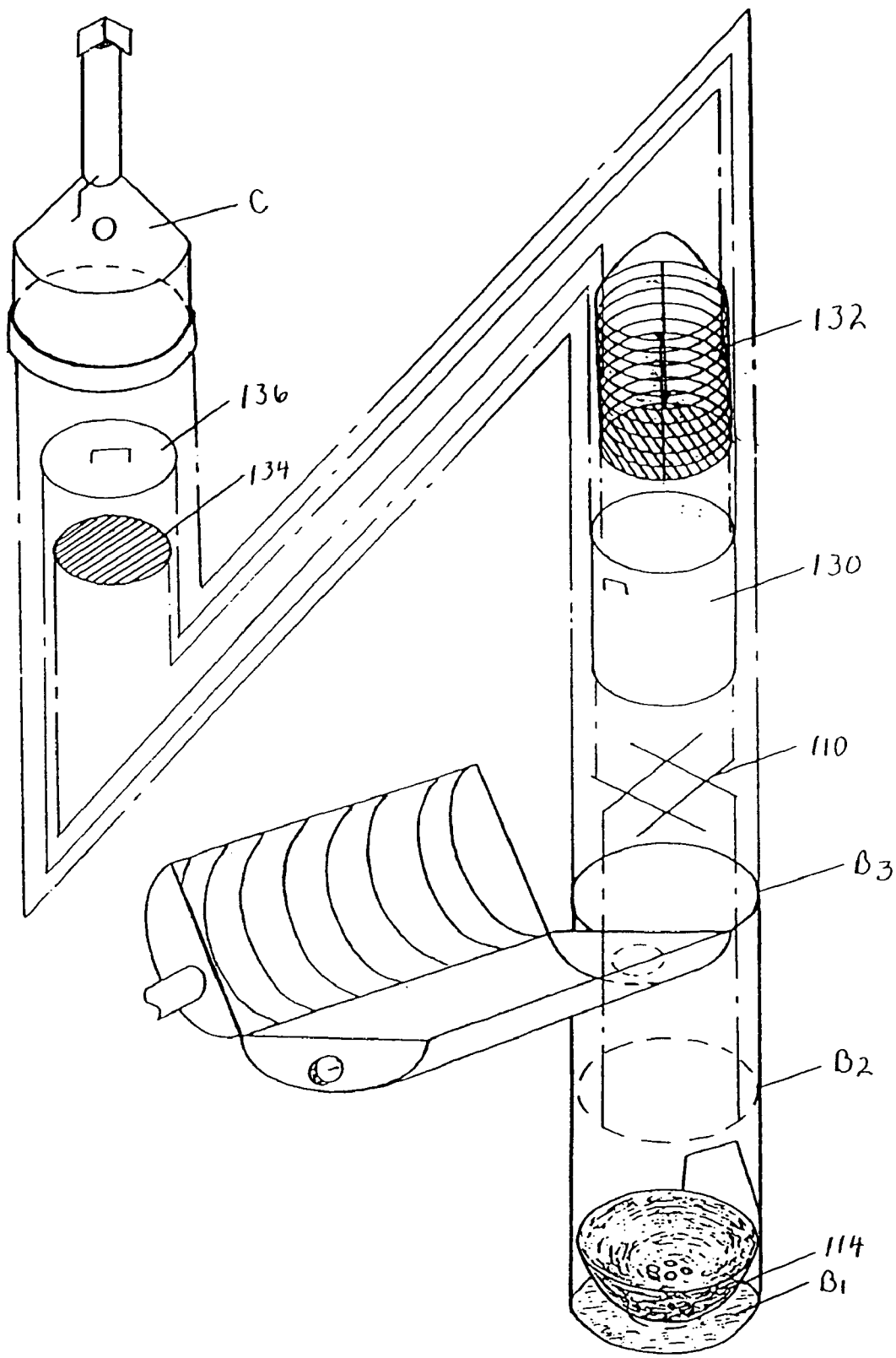
FIG. 13A is an exploded partial side view of an exemplary, non-limiting embodiment of the present invention.
Figure 13B:
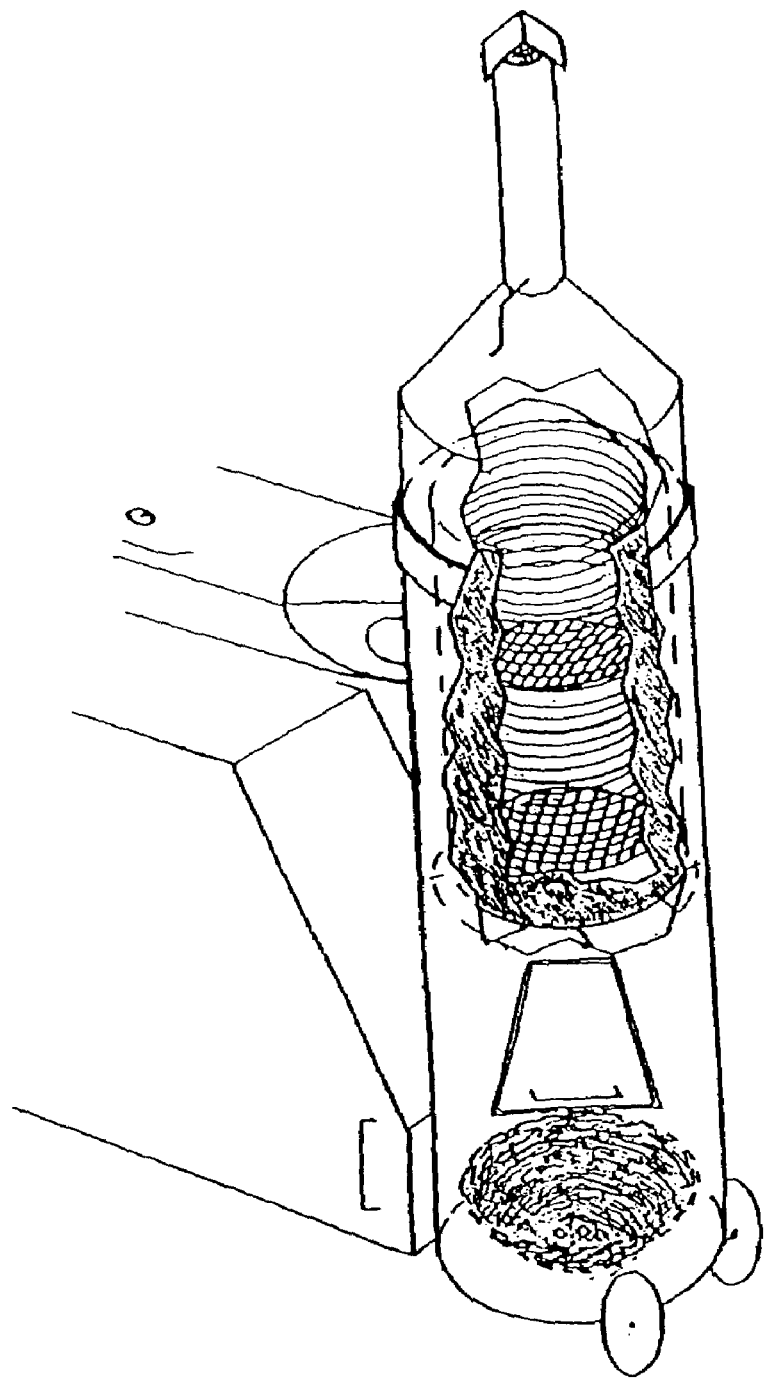
FIG. 13B is a partial side view of an exemplary, non-limiting embodiment of the present invention.

Another exemplary embodiment of the present invention is depicted in FIGS. 13A and 13B. A potholder 110 is placed at the second level B2, and holds a pot 130 to be used for cooking stew or chili. Optionally, the hood C and/or pot lid 130 could be used to facilitate the cooking of such foods.

If the pot 130 is not being used as above to provide a stewing cooking technique, the basket 132 could be placed inside the pot 130 to provide a deep frying cooking technique. The basket 132 and pot 130 deep frying arrangement, if sized appropriately, could be used to deep fry a turkey in the popular fashion.

The grate 134 may be placed inside the basket 132, resting on protrusive holders 140 partway up the height of the pot 130 to facilitate a steaming cooking technique.

The vertical smoker/grill B may also be used to provide extra tabletop space when the hood C is left off and the grate 102 is place on the third level B3.

Whenever a fire is built in the vertical smoker/cooker B, the damper 38 may be opened to divert a portion of the heat and smoke to the horizontal smoker/cooker A, which provides lower temperature hot smoking, cold/slow smoking, food warming, or another indirect-heat cooking technique. In such case, the rectangular grate 120 would often need to be used, along with the damper 30 and thermometer 59 of the horizontal smoker/grill A. Additionally, a fire could also be built in the horizontal smoker/grill A to allow for additional cooking techniques in the outdoor cooking machine system.

While aspects of the present invention have been particularly shown and described with reference to the exemplary, non-limiting embodiment above, it will be understood by those skilled in the art that various additional embodiments may be contemplated without departing from the spirit and scope of the present invention. For example, the dampers could be of a different type than shown and described; the dimensions, cross sectional shapes, and/or relative sizing of the horizontal and vertical smoker/grills A,B could differ from those shown and described; an automatic water system could be provided for cooking techniques which require that water be used with the outdoor cooking machine; and/or the outdoor cooking machine could be configured to use any suitable type of fuel. However, a device or method incorporating such an embodiment should be understood to fall within the scope of the present invention as determined based upon the claims below and any equivalents thereof.

Other aspects, objects and advantages of the present invention can be obtained from a study of the drawings, the disclosure and the appended claims.

I claim:

1. A machine for heating, cooking, and smoking at least one of food and another substance, such machine comprising:

a horizontal smoker/grill including a lower horizontal smoker/grill portion comprising means for supporting a horizontal smoker/grill fire;

a vertical smoker/grill including an upper vertical smoker/grill portion comprising means for supporting a vertical smoker/grill fire;

means for connecting the upper vertical smoker/grill portion to the lower horizontal smoker/grill portion, said means for connecting including a tube adapted to direct at least one of smoke and air; and at least one damper adapted to control at least one of smoke and air flowing through said tube;

wherein said vertical portion further comprises a plurality of support structures each supporting a vertical grill fire at a different respective height.

2. The machine of claim 1, wherein the horizontal smoker/grill includes:

a horizontal smoker/grill grate having high heat and low heat sides and located within the horizontal smoker/grill;

the horizontal smoker/grill fire being at least one of a wood fire and a gas-fired burner and providing high heat to the high heat side and low heat to the low heat side;

a horizontal smoker/grill hood defining a first end adjacent to the vertical smoker/grill, a second end opposite the first end, a center located between the first and second ends, and a top portion spaced apart from the horizontal smoker/grill grate, the horizontal smoker/grill hood including:

a chimney attached to the second end, the chimney being located at the top portion and having a predetermined chimney length adapted to induce a predetermined amount of airflow through the horizontal smoker/grill, the chimney having a base, and the chimney having a damper located at the base;

a thermometer located in the center of the horizontal smoker/grill hood; and a handle located below the thermometer and located on a side of the horizontal smoker/grill hood most accessible by a user of the machine, wherein the horizontal smoker/grill is adapted to grill food over the high heat and low heat sides and the user controls the horizontal smoker/grill fire using said at least one damper.

3. The machine of claim 2, wherein the horizontal smoker/grill includes:

at least two racks, with each rack having at least two slots located at various vertical distances above the horizontal smoker/grill fire;

the horizontal smoker/grill hood being moveable between open and closed positions;

at least one of a long spit stick and a short spit stick, each of the long and short spit sticks having a squared rod and being adapted to mate with the slots and thereby be rotatably supported by the racks, wherein the long and short spit sticks are adapted to be rotated by the user, and the short spit stick is adapted to allow the hood to move into a closed position;

means for rotating the long and short spit sticks, such means for rotating including at least one of a motorized rotisserie and a user-powered rotisserie; and wherein the horizontal smoker/grill grate is selectively removed to allow for at least one of grilling of food and maintenance of the horizontal smoker/grill fire, simultaneously while at least one of the long and short spit sticks is mated with the slots.

4. The machine of claim 2, including:

a base member adapted to hingeably support the horizontal and vertical smoker/grills, wherein the horizontal and vertical smoker/grills are selectively moveable between a closed position wherein the horizontal and vertical smoker/grills are positioned for operation by the cook and a tipped-up position wherein the horizontal and vertical smoker/grills are pivoted away from the base member into a non-operation position and thereby allow the user to access the base member directly;

a first level located within the vertical smoker/grill and a second level located above the first level within the vertical smoker/grill;

a firepan located in close proximity to at least one of the first and second levels and including a firepan damper at a bottom portion thereof, the firepan damper being accessible from below the base member and providing primary air control;

an access door in the vertical smoker/grill adapted to allow access for at least one of fuel addition, primary air control by way of the firepan damper, and secondary air control to the vertical smoker/grill fire, when the horizontal and vertical smoker/grills are in the closed position;

at least one of a cover and a vertical smoker/grill hood, the cover and vertical smoker/grill hood both adapted to selectively cover the top portion of the vertical smoker/grill, the vertical smoker/grill hood including a vertical smoker/grill hood damper adapted to selectively release smoke from the vertical smoker/grill;

a connecting damper located within the means for connecting and adapted to channel at least one of heat and smoke from the vertical smoker/grill to the horizontal smoker/grill;

at least one of an elongated dutch oven and a dutch oven with an associated dutch oven lid, selectively placed on the horizontal smoker/grill grate;

wherein the vertical smoker/grill fire is prepared in the firepan when the horizontal and vertical smoker/grills are in the tipped-up position, and when the vertical smoker/grill fire is burning in a predetermined manner, the horizontal and vertical smoker/grills are placed into the closed position, and wherein fuel can be added to the vertical smoker/grill fire through a top portion of the vertical smoker/grill when the horizontal and vertical smoker/grills are in the closed position; and wherein the horizontal smoker/grill selectively provides at least one of a food warming cooking technique, a cold smoking cooking technique, and a baking cooking technique.

5. The machine of claim 1, including a horizontal smoker/grill grate located within the horizontal smoker/grill and a horizontal smoker/grill hood movable between open and closed positions, wherein the horizontal smoker/grill grate selectively defines a tabletop when the horizontal smoker/grill hood is in the open position.

6. The machine of claim 1, wherein the vertical smoker/grill defines a third level at a top portion thereof, a circular grate is selectively placed at the third level, and the circular grate defines a tabletop.

7. The machine of claim 1, wherein the vertical smoker/grill defines a first level at a bottom portion thereof, the machine including:

a firepan selectively located at the first level, including a firepan damper at a bottom portion thereof, and supporting a vertical smoker/grill fire, wherein the firepan damper is operated selectively by a user to regulate the vertical smoker/grill fire;

a vertical smoker/grill hood adapted to selectively cover a top portion of the vertical smoker/grill and including a vertical smoker/grill damper, the vertical smoker/grill being adapted to release smoke from the vertical smoker/grill;

an access door located in the body of the vertical smoker/grill and adapted to allow the user to selectively access the vertical smoker/grill fire from outside the vertical smoker/grill, wherein the access door is selectively held open to provide an outdoor fireplace.

8. The machine of claim 7 wherein the vertical smoker/grill defines a third level at the top portion thereof, and a first circular grate is selectively located at the third level to provide a modified conventional grill cooking technique.

9. The machine of claim 8, wherein a second level is located between the first and third levels, including:

at least one of a second circular grate and a potholder is located at the second level and selectively supports a waterpan, the waterpan being filled with water;

a spacer selectively placed upon the first circular grate and adapted to selectively hold a third circular grate;

a horizontal smoker/grill damper is located within the horizontal smoker/grill;

a connecting damper is located within the means for connecting;

flow of at least one of smoke, heat, and steam through the machine is selectively controlled through at least one of the horizontal smoker/grill damper and the connecting damper; and wherein a hot smoker cooking technique is provided on at least the second and third levels by the vertical smoker/grill and an auxiliary smoker cooking technique, with a selectively different smoker temperature than the hot smoker cooking technique, is provided by the horizontal smoker/grill, and both the hot smoker and auxiliary smoker cooking techniques are provided by the vertical smoker/grill fire.

10. The machine of claim 9, wherein:
a potlifter is selectively placed in the waterpan;
a pot is selectively placed atop the potlifter, and a lid is selectively placed atop the pot; and
wherein a double boiling cooking technique is provided in the vertical smoker/grill by the pot and the potlifter.

11. The machine of claim 9, wherein
a pot is selectively supported by at least one of the potholder and the grate at the second level when the waterpan is not present at the second level;
a basket, including protrusive holders, is selectively placed within the pot;
a frying grate is selectively placed within the basket and supported by the protrusive holders; and
at least one of the pot, the basket, and the frying grate provides at least one of a deep frying cooking technique, a turkey frying cooking technique, a steaming cooking technique, and a stewing cooking technique.

12. The machine of claim 8, wherein the firepan is selectively located at the second level, such that the firepan damper is selectively accessed through the access door, to provide a second modified conventional grill cooking technique.

13. The machine of claim 8, including:
a second level defined by the vertical smoker/grill and interposed between the first and third levels;
a second circular grate selectively located at the second level;
a potholder selectively located at the second level, optionally supported by the second circular grate, and adapted to support a dutch oven having an associated dutch oven lid;
a vertical smoker/grill cover selectively placed at the third level and adapted to contain heat in the vertical smoker/grill; and
wherein a baking cooking technique is provided by the dutch oven and the vertical smoker/grill.

14. The machine of claim 8, wherein a third circular grate is selectively located at the third level and adapted to selectively support a dutch oven, thereby providing an alternate baking cooking technique.

15. The machine of claim 6, including:
a firepan selectively placed at the third level and supporting a vertical smoker/grill fire;
a circular grill placed atop the firepan;
a vertical smoker/grill hood selectively placed at the third level above the circular grill; and wherein the circular grill provides a conventional grill cooking technique.

16. The machine of claim 7 including:
a base member adapted to hingeably support the horizontal and vertical smoker/grills, wherein the horizontal and vertical smoker/grills are selectively moveable between a closed position wherein the horizontal and vertical smoker/grills are positioned for operation by the cook and a tipped-up position wherein the horizontal and vertical smoker/grills are pivoted away from the base member into a non-operation position and thereby allow the cook to access the base member directly,
wherein an open firepit cooking technique is provided on the base member when the horizontal and vertical smoker/grills are located in the tipped-up position.

17. A cooking device comprising:
a horizontal portion comprising a device operable to support a horizontal grill fire;
a vertical portion comprising a device operable to support a vertical grill fire; and
a connector configured to connect the vertical portion to the horizontal portion, the connector comprising a tube adapted to communicate at least one of smoke and air from the vertical portion to the horizontal portion and from the horizontal portion to the vertical portion,
wherein the horizontal and vertical grill fires are separated from each other, said vertical portion further comprises a plurality of support structures each operable to support the device operable to support the vertical grill fire and each of the support structures is located at a different respective height with respect to said vertical portion.

18. A cooking device comprising:
a horizontal portion comprising a device operable to support a horizontal grill fire;
a vertical portion comprising a device operable to support a vertical grill fire; and
a connector configured to connect the vertical portion to the horizontal portion, the connector comprising a tube adapted to communicate at least one of smoke and air from the vertical portion to the horizontal portion and from the horizontal portion to the vertical portion,
wherein the horizontal and vertical grill fires are separated from each other and, said horizontal portion comprises at least two devices each operable to support a respective horizontal grill fire.

19. A cooking device comprising:
a horizontal portion comprising a device operable to support a horizontal grill fire;
a vertical portion comprising a device operable to support a vertical grill fire; and
a connector configured to connect the vertical portion to the horizontal portion, the connector comprising a tube adapted to communicate at least one of smoke and air from the vertical portion to the horizontal portion and from the horizontal portion to the vertical portion,
wherein the horizontal and vertical grill fires are separated from each other and, at least one of the at least one damper corresponding to said vertical portion comprises one or more holes located in the device operable to support the vertical grill fire.

* * * * *